United States Patent
Kara

[19]

[11] Patent Number: 5,982,506
[45] Date of Patent: Nov. 9, 1999

[54] METHOD AND SYSTEM FOR ELECTRONIC DOCUMENT CERTIFICATION

[75] Inventor: Salim G. Kara, Houston, Tex.

[73] Assignee: E-Stamp Corporation, Palo Alto, Calif.

[21] Appl. No.: 08/711,080

[22] Filed: Sep. 10, 1996

[51] Int. Cl.⁶ .............. H04N 1/00; H04N 7/167; H04L 9/00
[52] U.S. Cl. .............. 358/405; 379/93.23; 380/30; 380/45; 380/49; 358/434
[58] Field of Search ............ 358/400, 403, 358/405, 406, 407, 468, 434–439; 379/93.23, 93.27, 106.01, 118–120; 370/252, 282; 380/25, 49, 50, 21, 9, 4

[56] References Cited

U.S. PATENT DOCUMENTS

| | | | |
|---|---|---|---|
| 4,458,109 | 7/1984 | Mueller-Schloer | 178/22.11 |
| 4,641,347 | 2/1987 | Clark et al. | 380/3 |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,763,271 | 8/1988 | Field | 364/466 |
| 4,775,246 | 10/1988 | Edelmann et al. | 380/23 |
| 4,800,506 | 1/1989 | Axelrod et al. | 364/478 |
| 4,802,218 | 1/1989 | Wright et al. | 380/23 |
| 4,812,994 | 3/1989 | Taylor et al. | 364/464.02 |
| 4,831,555 | 5/1989 | Sansone et al. | 364/519 |
| 4,864,618 | 9/1989 | Wright et al. | 380/51 |
| 4,868,757 | 9/1989 | Gil | 364/464.03 |
| 4,900,903 | 2/1990 | Wright et al. | 235/380 |
| 4,900,904 | 2/1990 | Wright et al. | 235/381 |
| 4,901,241 | 2/1990 | Schneck | 364/464.02 |
| 5,065,000 | 11/1991 | Pusic | 235/381 |
| 5,111,030 | 5/1992 | Brasington et al. | 235/375 |
| 5,136,643 | 8/1992 | Fischer | 380/23 |
| 5,239,168 | 8/1993 | Durst, Jr. et al. | 235/432 |
| 5,343,528 | 8/1994 | Heikkinen | 380/20 |
| 5,410,599 | 4/1995 | Crowley et al. | 380/9 |
| 5,553,145 | 9/1996 | Micali | 380/30 |
| 5,615,268 | 3/1997 | Bisbee et al. | 380/25 |
| 5,629,982 | 5/1997 | Micali | 380/30 |
| 5,631,961 | 5/1997 | Mills et al. | 380/21 |
| 5,666,420 | 9/1997 | Micali | 380/30 |
| 5,689,565 | 11/1997 | Spies et al. | 380/25 |
| 5,694,470 | 12/1997 | Jernbäcker | 380/23 |
| 5,708,709 | 1/1998 | Rose | 380/4 |

FOREIGN PATENT DOCUMENTS

| | | | |
|---|---|---|---|
| 0137737 | 9/1984 | European Pat. Off. | G07B 17/02 |
| 2580844 | 4/1986 | France | G07B 17/02 |
| 2678124 | 12/1992 | France | H04N 1/00 |
| 2706716 | 12/1994 | France | H04N 1/419 |
| 2251210 | 12/1990 | United Kingdom | G07B 17/00 |
| 8801818 | 3/1988 | WIPO | G07B 17/00 |
| 9712460 | 4/1997 | WIPO | H04L 9/00 |

OTHER PUBLICATIONS

PCT/US97/15949—International Search Report—European Patent Office.

Patent Abstracts of Japan.

*Primary Examiner*—Jerome Grant, II
*Attorney, Agent, or Firm*—Fulbright & Jaworski L.L.P.

[57] ABSTRACT

A system and method for certified transmission of an electronic document, as verified by the generation of a certification indicia. Three embodiments of the system and method are disclosed, providing for the certified transmission of a document through an independent certification device or for direct transmission from a sender to a recipient. Furthermore, the resulting certification indicia may be generated by an independent certification device or by a portable processor at the sender or receiver's location.

70 Claims, 12 Drawing Sheets

METHOD AND SYSTEM FOR ELECTRONIC DOCUMENT CERTIFICATION

BACKGROUND OF THE INVENTION

During the past decade the sending of documents from one location to another in electronic (soft) form has become ubiquitous. First facsimile (fax) began to replace hard delivery of documents and now E-mail and other forms of electronic transfer are becoming popular. In such electronic transmissions authenticity is becoming more and more of an issue.

At first blush the problem is simply one of not having an "original" signature on the received copy. Thus, systems are being devised to attach an electronic signature which can be authenticated both at the time of reception of the document and at subsequent points in time. Such signatures are necessary for certain document types, particularly when the document is to be used later in a court of law, or before a government official, to prove some contention pertaining to the content of the electronic transmission.

Another problem that exists and that has not been addressed is the fact that because of the speeds and relative ease of electronic transmission several different transmissions may occur in a matter of hours or even minutes, each changing one or more pages of the resultant copy. Traditionally, ambiguities over date are resolved because only one piece of paper could, as a practical matter, physically be delivered bearing a single date. This has all now changed. The same document may now be sent numerous times during the course of a single day and, if desired, different pages can have different content after each transmission. To make matters worse, the same document can be sent from different locations, some far away geographically, all arriving at roughly the same time. In this scenario the issue is not so much authenticity, but rather what document came at what time from which location containing what subject matter.

A need therefor exists in the art of electronic document transfer for establishing a mechanism for later determining the time a transmission was sent, proving where it was sent from, and proving the exact content of the transmission to a high degree of certainty.

Another need exists in the art of electronic document transfer for establishing a mechanism for later determining that a document was not sent at a particular time or that the document did not have a certain content therein.

SUMMARY OF THE INVENTION

These and other objects, needs and desires are obtained in a system and method of electronic document transfer in which a code is added to each document or to each page of each document, with the code containing data pertaining to the exact transmission. In one embodiment, each end of the transmission is coupled with a portable processor device which obtains certain bits of information from the other end for inclusion on the transmitted document. The data bits correspond to a special version of the sender's station code, the number of pages, the time, the total bit count of the document transmission, and other data associated with the document and its transmission. This then produces a special indicia to be printed on the received document. The full indicia is not transmitted from the sender, but rather created by the receiving end from the bits sent with the transmission. In this manner, every receiving station of a particular transmission will have a unique indicia, all based upon and generated in response to the bits transmitted with the transmission.

The difference in each indicia at each receiving location is due to the unique characteristics of that station as contained in the indicia. In this manner, the authenticity of each transmission can be determined by comparison of the received bits to the code of the receiving station. Since included in each transmission is the exact time of the reception, and the exact number of received bits, the probability of two transmissions having the same cipher is very remote indeed.

Part of the printed indicia is an encrypted checksum for the document, or each page if desired. In one embodiment, the printed indicia will appear only on the first page of the printed transmitted document, with the checksum for all of the pages encrypted onto this single printed indicia. In a more precise system, and an alternative embodiment, each received page printed is provided with its own indicia, having contained therein a count of bits for that page as well as other information unique to that page. Additionally, the recipient of the document could, if desired, select between the two systems depending upon the level of authentication desired.

In other embodiments, the transfer of the electronic document is accomplished through a system independent from either end of the transmission. The independent system may be utilized for a higher level of authentication or certification as well as additional services. In one embodiment, the independent system provides a high degree of certification by verifying the transmission and receipt of the electronic document from the sending end to the receiving end. Verification by the independent system involves checking data bits associated with the document sent from the sending end against data bits associated with the document received by the receiving end. These data bits may include a special version of the sender's and/or recipient's station code, the number of pages, the time, the total bit count of the document transmission, and other data associated with the document and its transmission. It shall be appreciated that an advantage of such an embodiment is realized in the fact that the document may be directly transmitted by the sender to the receiver with only the verification data bits being communicated to the independent system. Upon verification, the independent system transmits an indicia of certification to the receiving end to be included in the printed document as well as to the sending end for proof of certified delivery.

In another embodiment, the independent system receives the document from the sending end and relays it to the receiving end. Both the receiving and sending of the document by the independent system involve verification of the document's contents against data bits associated with the document's transmission. These data bits correspond to a special version of the sender's or recipient's station code, the number of pages, the time, the total bit count of the document transmission, or other data associated with the document and its transmission. Upon verification of receipt of the document by the receiving end, the independent system issues an indicia of certification to the receiving end to be included in the printed document as well as to the sending end for proof of certified delivery.

An advantage of the utilization of the independent system in the above manner is that any sender's certification indicia can be later authenticated with a duplicate indicia stored within the independent system. Moreover, the transmission of the electronic document through an independent system provides an opportunity for additional services at the independent system. In one embodiment, the independent system provides document archiving services for documents transmitted therethrough.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The present invention provides for the certification of electronic delivery of a transmitted document. Although the present invention may be accomplished through varying means, three preferred embodiments are described in detail below.

Figure 3A:
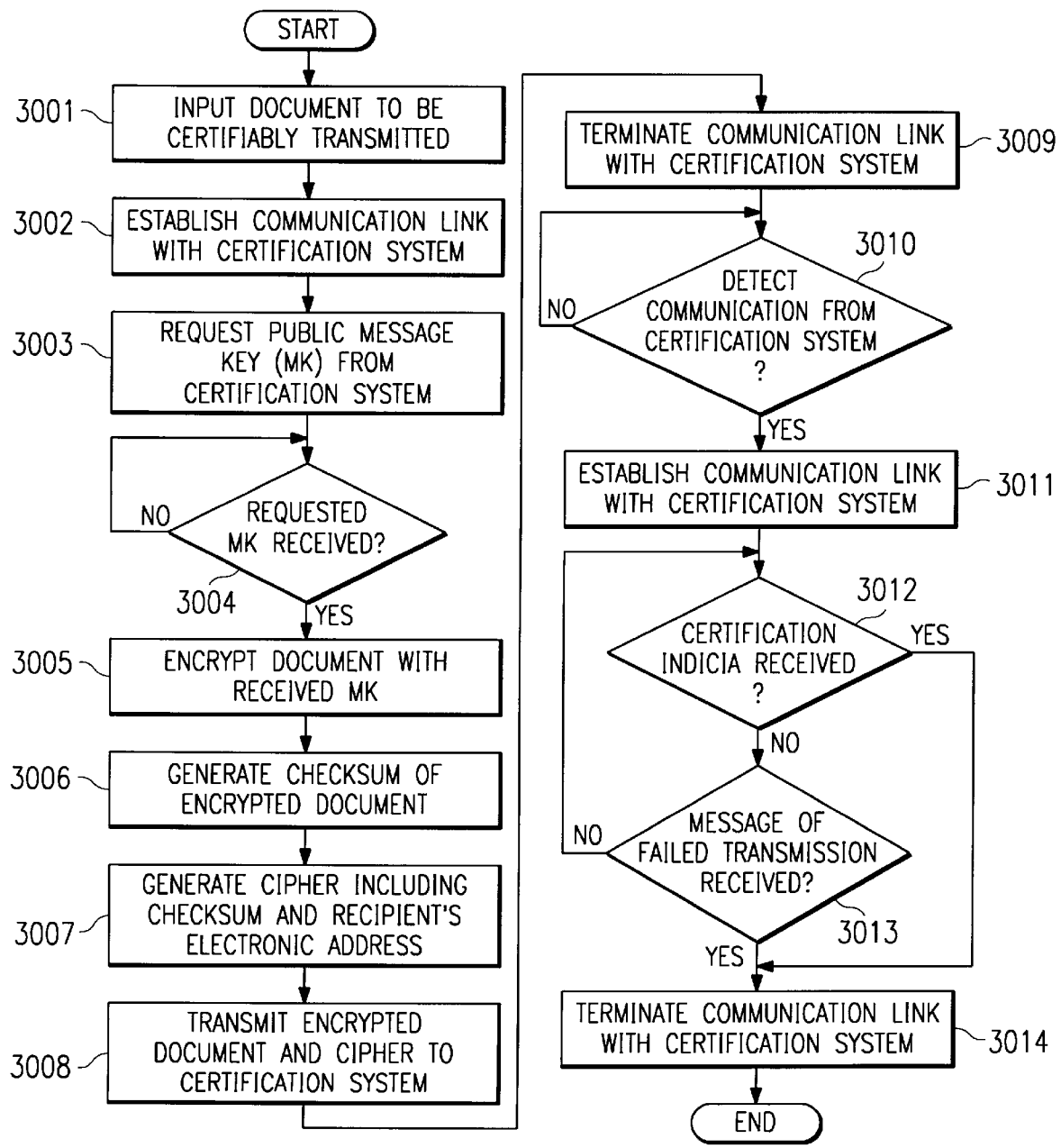
FIG. 3A illustrates a flow diagram of the sending processes of a preferred embodiment of the present invention wherein the document to be certified is transmitted through an independent processor-based system.
Figure 3B:
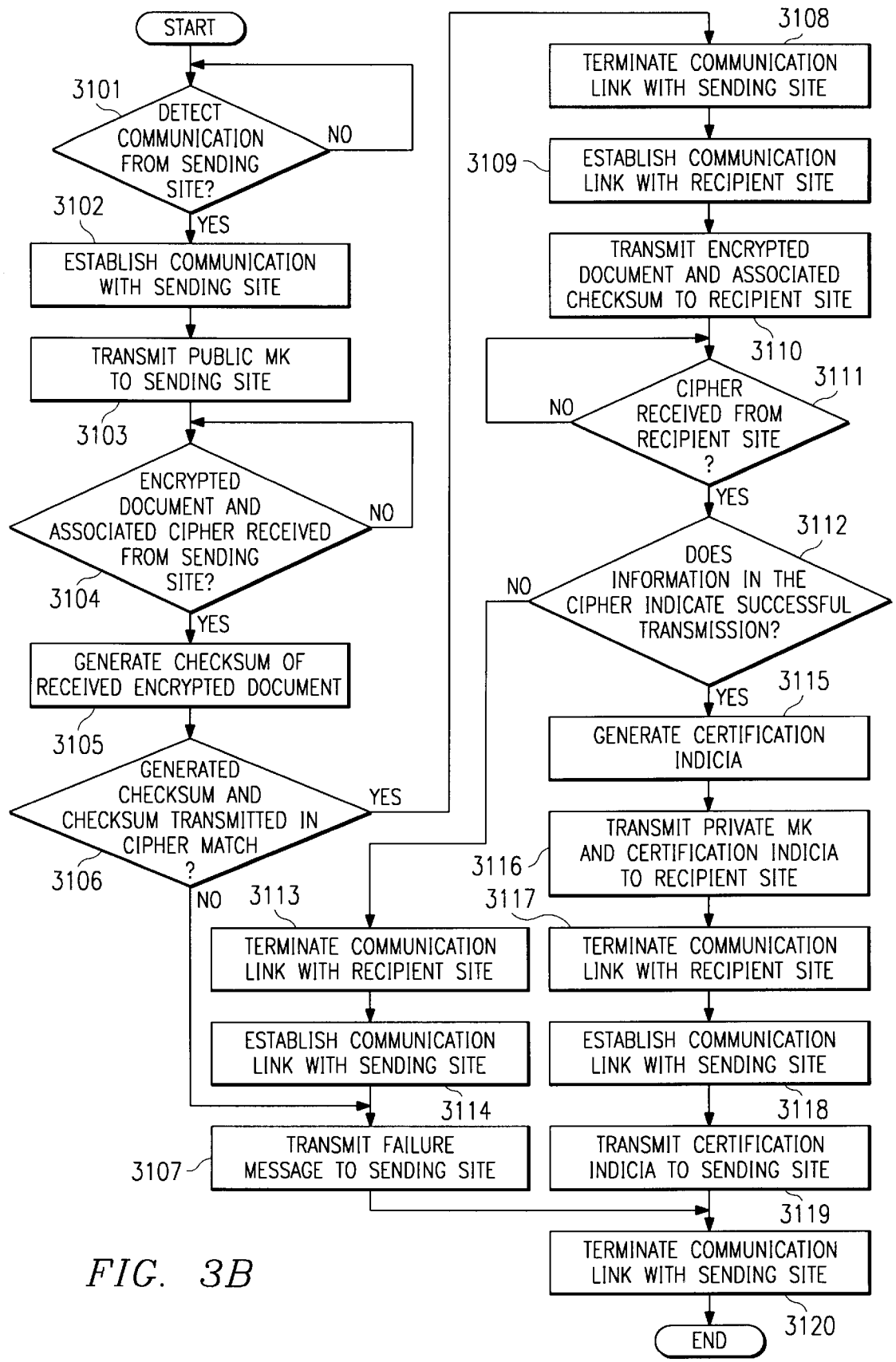
FIG. 3B illustrates a flow diagram of the independent certification process of a preferred embodiment of the present invention wherein the document to be certified is transmitted through an independent processor-based system.
Figure 3C:
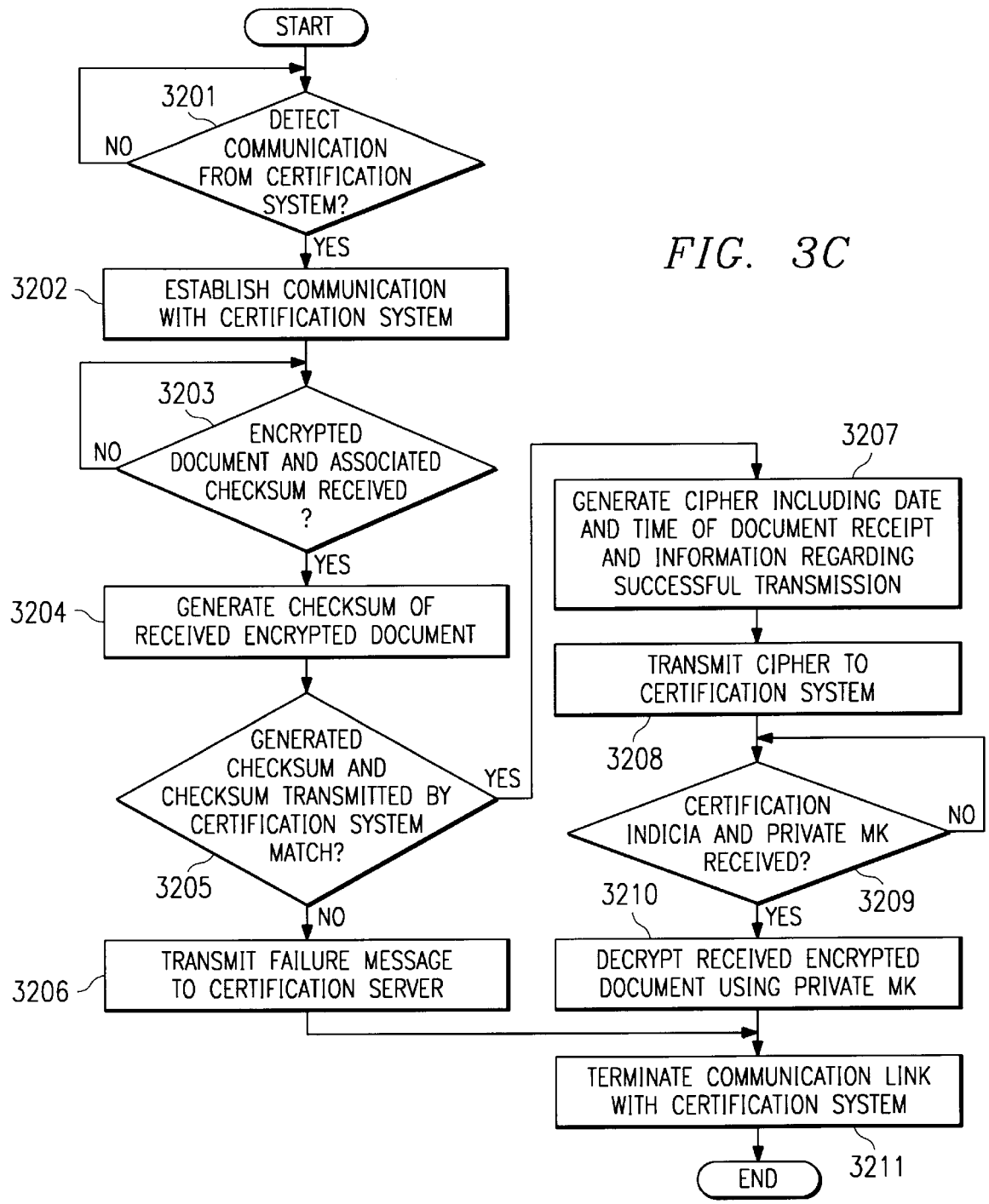
FIG. 3C illustrates a flow diagram of the receiving process of a preferred embodiment of the present invention wherein the document to be certified is transmitted through an independent processor-based system.
Figure 3D:
FIG. 3D illustrates the path of communications between the various components of a preferred embodiment of the present invention.

Transmission of a Document to be Certified Through an Independent Certification System In the first preferred embodiment, the certified transmission of a document is accomplished by transmitting the document from a sending site, through a certification system, to a recipient site as illustrated in FIG. 3D. In this system a user invokes a first processor-based system (PC) to certifiably transmit a selected document via a program, hereinafter referred to as the "Send" program, stored on the first PC. The Send program requests input from the user, co-existing process, or coupled devices, about the electronic document to be transmitted, to whom it is to be transmitted, including an electronic address such as e-mail address or telephone number of receiving data communications equipment, level of certification desired, etc. A request for a public cryptographic key, hereinafter public message key (MK), is then made to a remote certification device. The public message key allows the Send program to encrypt the selected electronic document for transmission. Upon encryption, a cipher, comprised of selected data bits, is generated by the Send program. This cipher includes a checksum and/or total bit count of the encrypted electronic message and additional information provided by the Send program such as the recipient's electronic address identification of the sending site, time of document transmission, and number of pages in the document to be transmitted. It shall be understood that any form of summarily indicating the content of the encrypted electronic message may be utilized in place of a checksum and/or total bit count if desired. Furthermore, although the following discussion refers primarily to the use of a checksum, it shall be understood that any summary indication of the content of the encrypted electronic message in combination with, or in place of, a checksum may advantageously be used.

The encrypted electronic document and associated cipher are transmitted by the Send program to a remote certification device. In the preferred embodiment the remote certification device is itself a second PC. The remote certification device stores a program, hereinafter referred to as the "Certification" program, which receives encrypted electronic documents and associated ciphers from sending sites and verifies the received encrypted document against the cipher.

Upon verification of the received encrypted document, the Certification program transmits both the encrypted document and the cipher to the recipient indicated by the cipher.

In the preferred embodiment the recipient site is also a PC. The recipient site stores a program, hereinafter referred to as the "Receive" program, which receives encrypted electronic documents and associated ciphers from certification systems and verifies the received encrypted document against the cipher. Upon verification, a cipher is generated by the Receive program. This cipher includes a checksum of the received encrypted electronic document and additional information provided by the Receive program, such as the exact time of receipt and identification of recipient site.

The cipher is transmitted to the certification system. The Certification program verifies that the checksum of the encrypted electronic document received by the Receive program matches the checksum of the encrypted electronic document originally sent by the Send program. Upon a match, the Certification program generates an indicia of certification which includes the checksum of the encrypted electronic document, date and time of receipt by the recipient, number of pages in the document, identification of the recipient, and identification of the sender. This indicia is then transmitted to the sender for proof of certified transmission of an electronic document.

The certification indicia, along with the private MK, is transmitted to the recipient. The Receive program then utilizes the private MK to decrypt the received encrypted electronic document. Upon decryption, the Receive program integrates the certification indicia within the decrypted document for subsequent printing.

Figure 1:
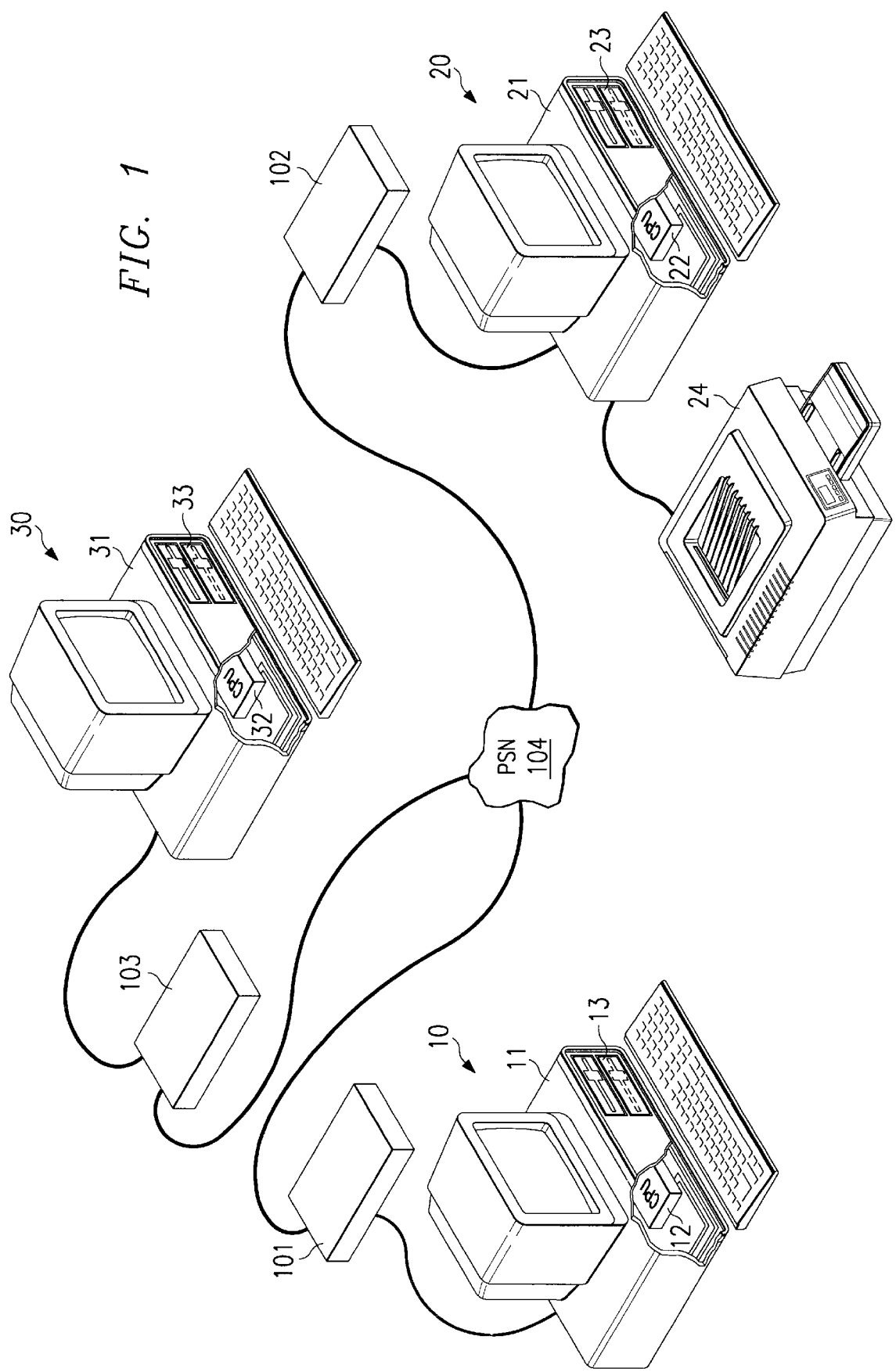
FIG. 1 illustrates the processor-based systems of a preferred embodiment of the present invention.

Referring to FIG. 1, there are illustrated processor-based systems (PCs) 10, 20 and 30 utilized in the above described preferred embodiment of the present invention. Specifically, PC 10 is utilized to implement the aforementioned Send program, PC 20 is utilized to implement the Receive program, and PC 30 is utilized to implement the certification program. PC 10 includes chassis 11 enclosing processor (CPU) 12 and disk drive 13. Likewise PC 20 includes chassis 21 enclosing CPU 22 and disk drive 23 and PC 30 includes chassis 31 enclosing CPU 32 and disk drive 33. PCs 10, 20 and 30 are general purpose computers, such as an IBM compatible (or Apple Macintosh) controlled by any general purpose operating system such as DOS or UNIX. It should be noted that PCs 10, 20 and 30 may each be of differing types and/or controlled by different operating systems.

Still referring to FIG. 1, it can be seen that PCs 10, 20 and 30 may be linked together through Public Switched Network (PSN) 104 via modems 101, 102 and 103. PSN 104 may be comprised of any number of now existing or later to be developed communications means. In the preferred embodiment, PSN 104 comprises public telecommunications lines and switching equipment. Alternatively, PSN 104 comprises digital communication over the Internet or similar wide area public gateway. Additionally, PCs 10, 20 and 30 may be linked directly through digital telecommunications trunks (not shown) or through a digital network system (not shown). It shall be understood that in utilizing a digital network system to link PCs 10, 20 and 30 that modems 101, 102 and 103 are replaced by network interface cards (NIC) or other digital communications devices, eg., ISDN. It will be appreciated by those of skill in the art that any network linking PCs 10, 20 and 30 may either be secure or not, depending on the degree of security desired with respect to the transmission of the document to be certified.

It shall be appreciated that PCs 10, 20 and 30 may be linked via differing communication means such as, for example, PCs 10 and 20 being linked by PSN 104, PCs 10 and 30 being linked by a digital network (not shown) using NICs (not shown), and PCs 20 and 30 being linked by a digital telecommunications trunks (not shown). One of skill in the art will recognize that an advantage of the use of differing communication means is that transmittal of certified documents is simplified by the ability to utilize preexisting, and often differing, communication means. Furthermore, the ability to use differing communication means in the transmission of a single certified document promotes the transmission of such documents as transmission is not limited to processor-based systems having only a particular form of communication means coupled thereto.

With further reference to PC 20 illustrated in FIG. 1, printer 24 is depicted. Printer 24 is coupled to CPU 22 and provides printing means for the received certified document and indicia of certification. Of course, printer 24 is optional and certified transmission of a document may be accomplished without the need for printing the received document.

Directing attention to FIG. 3A, a flow diagram of a preferred embodiment of the Send program utilizing the system illustrated in FIG. 1 is depicted. Upon activation of the Send program, the user is asked for, and the process accepts, an electronic document to be certifiably transmitted by the system (step 3001).

It shall be appreciated by one of skill in the art that the Send program may be executed in the form of a terminate and stay resident (TSR) program and therefore allow for the automatic association by the Send program of a document created within a co-executing process. In a preferred embodiment, the Send program is capable of execution in a multi-tasking environment, such as the MICROSOFT WINDOWS operating environment, therefore providing the ability to select and transmit an electronic document created in a co-executing process as well as to integrate a received certification indicia within the original electronic document.

At step 3002 the Send program establishes a link between PCs 10 and 30. The link established in step 3002 is a link suitable for data communications between PCs 10 and 30, such as PSN 104 illustrated in FIG. 1. In the preferred embodiment, linking step 3002 includes the substeps of dialing a data communications access phone number, providing information as to which resource available through the data communications access is to be utilized, and verifying that data communications with a document transmission certification system has been accomplished.

It shall be understood that there is no limitation of the present invention to establish and terminate the communications link between PCs 10 and 30. For example, where digital telecommunications trunks (not shown) or a digital network system (not shown) are utilized for linking PCs 10 and 30, a data communication link may advantageously be maintained for extended periods of time thereby eliminating the need for the Send program to establish and terminate the communications link.

Upon establishing a link between PCs 10 and 30, the Send program requests a public message key (MK) from the certification system (step 3003). The public key so requested is part of a cryptographic key set stored in, or generated by, the certification system which includes at least one public cryptographic key and at least one corresponding private cryptographic key.

At step 3004 the Send program receives requested public MK transmitted by the certification system. This public MK is utilized by the Send program to encrypt the electronic document selected for certified transmission (step 3005). It shall be appreciated by those of skill in the art that an electronic document encrypted using an encryption key, such as the public MK, may only be decrypted using a corresponding decryption key, such as the private MK. Therefore, after encryption using the public MK, the Send program cannot decrypt the document without receiving a private MK from the certification system.

Depending on the form of the communication link between PCs 10 and 30, it may be advantageous to terminate the communication link between PCs 10 and 30 while preparing to transmit a send cipher and encrypted document. In such an embodiment, the Send program re-establishes the communication link between PCs 10 and 30 when prepared to transmit a send cipher and encrypted document.

At step 3006, the Send program generates a checksum of the encrypted document. This checksum, as well as additional information provided by the Send program, is combined into a cipher by the Send program at step 3007. In the preferred embodiment, the number of pages to be transmitted, the recipient's electronic address and identification information regarding the Send program is also included in the cipher. However, other, or additional, information may be included in the cipher such as date and time of transmission of the electronic document, a method of payment for certification of the transmission, or instructions for the certification system to archive a copy of the transmitted document, if desired. Furthermore, the inclusion of more than one recipient's electronic address in the cipher allows for multiple certified transmissions of a single electronic document.

Figure 2:
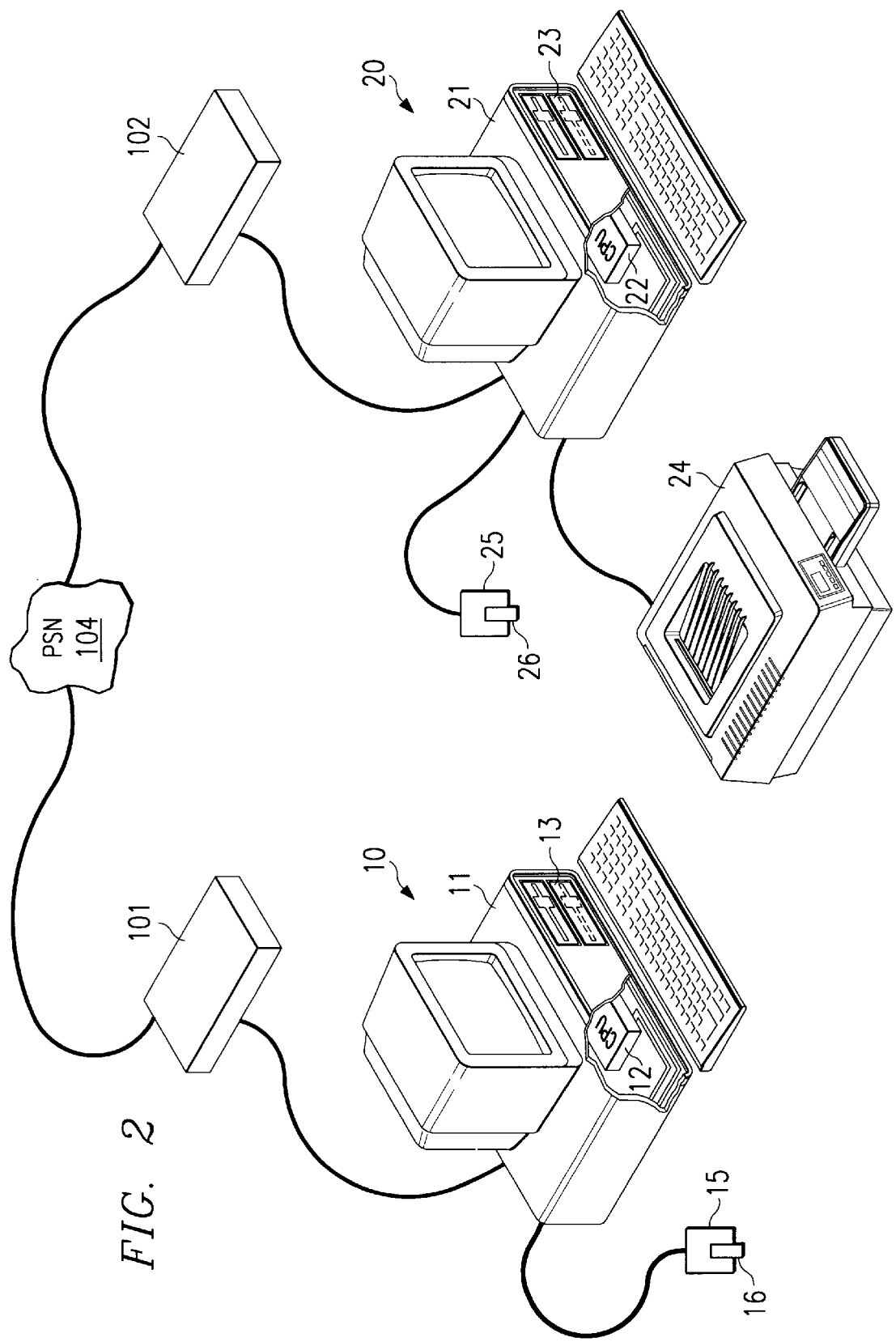
FIG. 2 illustrates the processor-based systems of an alternative preferred embodiment of the present invention.

In an alternative embodiment, payment for certified transmission of electronic documents may be accomplished by the Send program deducting a value associated with the service from a credit stored in a portable memory coupled to PC 10, such as portable processor 16 illustrated in FIG. 2. A portable memory and method for deducting a value from a credit stored within is taught in co-pending patent application Ser. No. 08/515,988, filed Aug. 8, 1995, and entitled "System and Method for Controlling the Storage of Data Within a Portable Memory," which is hereby incorporated by reference. However, it shall be understood that the invention may be accomplished without any method of payment for the service being provided if desired.

After generating a cipher, the Send program transmits the encrypted document and associated cipher to the certification system via the established communication link (step 3008). If desired, the cipher, or the combination of the cipher and encrypted document, may be encrypted using cryptographic keys common to the Send program and the certification system to provide added security to the transmission. Such encryption may be advantageous in the case where the cipher includes sensitive information such as a method of payment.

After transmission of the encrypted document the Send program terminates the communication link with the certification system (step 3009) and monitors data communications for the presence of the certification system (step 3010). Indication of incoming certification system communication may appear as a ring indication at a modem 101, through which a communication link is established, or any other suitable means. When the certification system is detected, the Send program establishes a communication link with the certification system (step 3011) and awaits receipt of a certification indicia from the certification system (step 3012).

If a message indicating failure of certified transmission is received instead of a certification indicia (step 3013), then the Send program terminates the communication (step 3014). Of course, rather than terminating the communication link, the Send program may instruct the certification system to re-attempt the certification process, if desired.

In the case of multiple recipient electronic addresses being included in the cipher transmitted to the certification system, the Send program may receive multiple certification indicia. The certification indica is the Send program's confirmation that the transmitted document was successfully transmitted to the indicated recipient, being verified as received against the generated checksum, and includes the exact date and time of receipt of the document. The indicia may be integrated into the original document by the Send program, or may be printed or stored, for example, on disk drive 13, for later proof of certified transmission of the electronic document.

Upon completion of the steps above, the Send program terminates the communication link between PCs 10 and 30 at step 3014. It shall be understood that, although the foregoing discussion disclosed the certified transmission of a single electronic document, that multiple electronic documents may be certifiably transmitted in any session. If desired, multiple electronic documents may be transmitted by returning to an earlier step, such as step 3005, to continue the process again rather than terminating the communication link as in step 3014.

Having explained in detail the Send program of a preferred embodiment of the present invention, attention is directed to FIG. 3B wherein a flow diagram of a preferred embodiment of the Certification program is depicted. Upon execution of the Certification program, data communications are monitored for the presence of a demand site (step 3101). When the Certification program detects the presence of a sending site, such as, for example, by a ring indication at modem 103, a link capable of data communication is established at step 3102, as discussed in association with the Send program, in an alternative embodiment, where digital telecommunications trunks (not shown) or a digital network system (not shown) are utilized for linking PCs 10 and 30, a data communication link may advantageously be maintained for extended periods of time.

At step 3103, the Certification program transmits a public MK to the sending site. The associated private MK is retained by the Certification program to prevent the sending site from being able to alter the electronic document once encrypted using the public MK.

After transmission of the public MK the Certification program awaits receipt of an encrypted electronic document and associated cipher from the sending site (step 3104). Depending on the form of the communication link established between PCs 10 and 30, it may be advantageous to terminate the communication link between PCs 10 and 30 while awaiting receipt of the encrypted electronic document and associated cipher. In such an embodiment, the Certification program re-establishes the communication link between PCs 10 and 30 upon indication of incoming sending site communication, such as a ring indication at a modem 103, through which a communication link is established.

If encryption of the cipher, or the combination of the cipher and encrypted document, is used, the additional substep of decrypting the cipher or combination of the cipher and encrypted document is necessary for meaningful use of their contents.

After receipt of the encrypted document, the Certification program generates a checksum of the received encrypted document (step 3105). This generated checksum is then verified against the checksum received in the cipher (step 3106). If the checksums do not match, a certified transmission cannot be completed and the Certification program returns a message indicating failure to the sending site at step 3107 and subsequently terminates the communication link at step 3120.

It will be appreciated by those of skill in the art that a mismatch of the transmitted checksum and the generated checksum indicates the electronic document originally encrypted by the sending site and the electronic document received by the Certification program are not identical. Certification of transmission of such a document would be meaningless as there would be ambiguity as to the contents of any document certified as received by the recipient.

In an alternative embodiment, where a payment method is included in the transmitted cipher, the Certification program utilizes this information to receive payment for the certification service performed. Such payment may involve the sending site having a credit or debit account with the certification provider or may utilize point of sale funding methods such as a valid bank card account. Use of credit and debit accounts require the sending site to supply the certification provider with information suitable for setting up such accounts prior to a certified transmission. In the case of a credit account, the user may be periodically billed for certified transmissions previously sent. In the case of a debit account, the user prepays for certified transmissions to be sent in the future. Upon making certified transmissions, costs of the transaction are deducted from the user's debit account. In the case of a bank card account being utilized, the provider will demand authorization of payment from the bank card company concurrent with the certified transmission. However, credit could be maintained at the sending site, as discussed above, and be decremented in the value of certification services upon a certified transmission. Furthermore, the system may provide for any of these methods with the sender selecting a payment method for each certified transmission.

Where instructions for the certification system to archive a copy of the transmitted document are included in the transmitted cipher, the Certification program causes a copy of the encrypted document to be stored within PC 30. Such storage may involve writing the encrypted document to disk drive 33 along with a private MK suitable for later decryption of the document. Alternatively, archiving the document may involve decryption of the document prior to storing it within a suitable storage media.

After a valid match of the received checksum and generated checksum is determined, the Certification program terminates the communication link with the sending site (step 3108) and establishes a link between PC 30 and PC 20 of a recipient site indicated by a recipient's electronic address included in the cipher received from the sending site (step 3109). The link established in step 3109 is a link suitable for data communications between PCs 20 and 30, such as PSN 104 illustrated in FIG. 1. In the preferred embodiment, linking step 3108 includes the substeps of dialing a data communications access phone number, providing information as to which resource available through the data communications access is to be utilized, and verifying that data communications with a document recipient site has been accomplished.

As discussed above, there is no limitation of the present invention to establish and terminate the communications link. For example, where digital telecommunications trunks (not shown) or a digital network system (not shown) are utilized for linking PCs 20 and 30, a data communication link may advantageously be maintained for extended periods of time.

Where the cipher received from the sending site includes multiple recipient's electronic addresses, the Certification program will establish communication with multiple ones of PC 20. Communication with multiple PCs 20 may be accomplished by simultaneously establishing a communication link with each recipient indicated by the electronic addresses included in the cipher, or by returning to step 3109 for each additional recipient after completion of certification to a previous recipient.

Upon establishing a link between PCs 30 and 20, the Certification program transmits the encrypted electronic document and associated checksum to the recipient site (step 3110). After transmission of the encrypted document and associated checksum, the Certification program awaits communication of a cipher from the recipient site (step 3111).

After receipt of the cipher, the Certification program analyzes information contained within the cipher to verify that a successful transmission of the encrypted electronic document originally sent by the sending site has been received by the recipient (step 3112). If the information within the cipher does not indicate a successful transmission, the transmission cannot be certified and the Certification program terminates the communication link with the recipient site (step 3113), establishes a communication link with the sending site (step 3114), transmits a message indicating failure to the sending site (step 3107) and subsequently terminates the communication links (step 3120).

Upon determination of a successful transmission of the encrypted electronic document at step 3112, the Certification program generates a certification indicia (step 3115). The indicia generated by the Certification program is in a form suitable for transmission to both the Send and Receive programs discussed in detail below.

At step 3116, the Certification program transmits a private MK and certification indicia to the recipient site. The transmitted private MK corresponds to the public MK previously transmitted by the Certification program to the sending site. Thereafter the communication link with the recipient site is terminated (step 3117) and a communication link with the sending site is established (step 3118).

At step 3119, the Certification program transmits the certification indicia to the sending site. Where the cipher sent by the sending site includes multiple recipient's electronic addresses, the Certification program transmits a certification indicia to the sending site for each recipient to whom the document was certifiably transmitted.

In addition to transmitting the certification indicia to the sending and recipient sites, the Certification program may store a copy of the indicia within PC 30. Such a copy of the certification indicia may be later used to authenticate a copy of an indicia purporting to show certified transmission of an electronic document.

Upon completion of the steps above, the Certification program terminates the communication links at step 3120. However, if multiple recipient electronic addresses are included in the cipher received from the sending site, the Certification program may return to step 3109 to certifiably transmit additional copies of the document.

Having explained in detail the Send and Certification programs of a preferred embodiment of the present invention, attention is directed to FIG. 3C wherein a flow diagram of a preferred embodiment of the Receive program is depicted. Upon execution of the Receive program, data communications are monitored for the presence of a sending site (step 3201). When the Receive program detects the presence of a certification system, such as by a ring indication at modem 102, a link capable of data communication is established (step 3202). As discussed above, in alternative embodiment, where digital telecommunications trunks (not shown) or a digital network system (not shown) are utilized for linking PCs 20 and 30, a data communication link may advantageously be maintained for extended periods of time thereby eliminating the need to establish and terminate communication between PCs 20 and 30.

It shall be appreciated by one of skill in the art that the Receive program may be executed in the form of a terminate and stay resident (TSR) program and therefore provide the opportunity to utilize PC 20 for other processes while still monitoring modem 102 for communication from a certification system. In a preferred embodiment, Receive program is capable of execution in a multi-tasking environment, such as the MICROSOFT WINDOWS operating environment, therefore providing the ability to monitor for, receive, and process certified electronic documents simultaneously with other processes occurring in CPU 22.

Upon establishing a link between PCs 20 and 30, the Receive program receives the encrypted electronic document and associated checksum transmitted by the certification system (step 3203). Depending on the form of the communication link established between PCs 20 and 30, it may be advantageous to terminate the communication link between PCs 20 and 30 while preparing to transmit a receive cipher. In such an embodiment, the Receive program re-establishes the communication link between PCs 20 and 30 when prepared to transmit a receive cipher.

After receipt of the encrypted document and checksum, the Receive program generates its own checksum of the received encrypted document (step 3204). The checksum generated by the Receive program is then verified against the checksum received from the certification system (step 3205). If the checksums do not match, a certified transmission cannot be completed, therefore, a message is transmitted to the certification system indicating failure (step 3206) and the communication link is terminated (step 3211). It will be appreciated by those of skill in the art that a mismatch of the transmitted checksum and the generated checksum indicates that the electronic document originally encrypted by the sending site and the electronic document received by the Receive program are not identical. Certification of transmission of such a document would be meaningless as there would be ambiguity as to the contents of any document certified as received by the recipient.

After a valid match of the received checksum and generated checksum is determined, the Receive program combines this checksum with additional information provided by the Receive program into a cipher (step 3207). In the preferred embodiment, the date and time of receipt of the transmitted document as well as information indicating a match between the generated and received checksums are included in the cipher. However, other, or additional, information may be included in the cipher, such as information identifying the receiving station or instructions for the certification system to archive a copy of the transmitted document, if desired.

At step 3208 the cipher is transmitted by the Receive program to the certification system, via the established communication link. However, if the communication link has been terminated, and discussed above, transmitting step 3208 includes the substep of re-establishing the communication link between PCs 20 and 30.

If desired, the cipher may be encrypted using cryptographic keys common to the Receive program and the certification system to prevent unauthorized access to the information contained within the cipher. Encryption of the cipher may be advantageous in the case where the interception of and tampering with the cipher is a concern.

After transmission of the cipher the Receive program awaits receipt of a certification indicia and private MK from the certification system (step 3209). Depending on the form of the communication link established between PCs 20 and 30, it may be advantageous to terminate the communication link between PCs 20 and 30 while awaiting receipt of a certification indicia and private MK. In such an embodiment, the Receive program re-establishes the communication link between PCs 20 and 30 upon indication of incoming certification system communication, such as a ring indication at a modem 102, through which a communication link is established.

At step 3210 the received private MK is used to decrypt the transmitted document. The received certification indicia may be incorporated within the decrypted received document to appear as an integral part of the document. In such a case, the certification indicia would appear in all copies, be they printed or electronic, of the transmitted document. Also, the received certification indicia may be stored by the Receive program for later comparison with a purported certification indicia presented by the sender of a document.

Upon completion of the steps above, the Receive program terminates the communication link between PCs 20 and 30 at step 3211. Although the foregoing discussion disclosed the certified reception of a single electronic document, multiple electronic documents may be certifiably received in any session by repeating the steps above. If desired, additional electronic documents may be received by returning to an earlier step, such as step 3203, to continue the process again rather than terminate the communication link at step 3211.

Figure 4A:
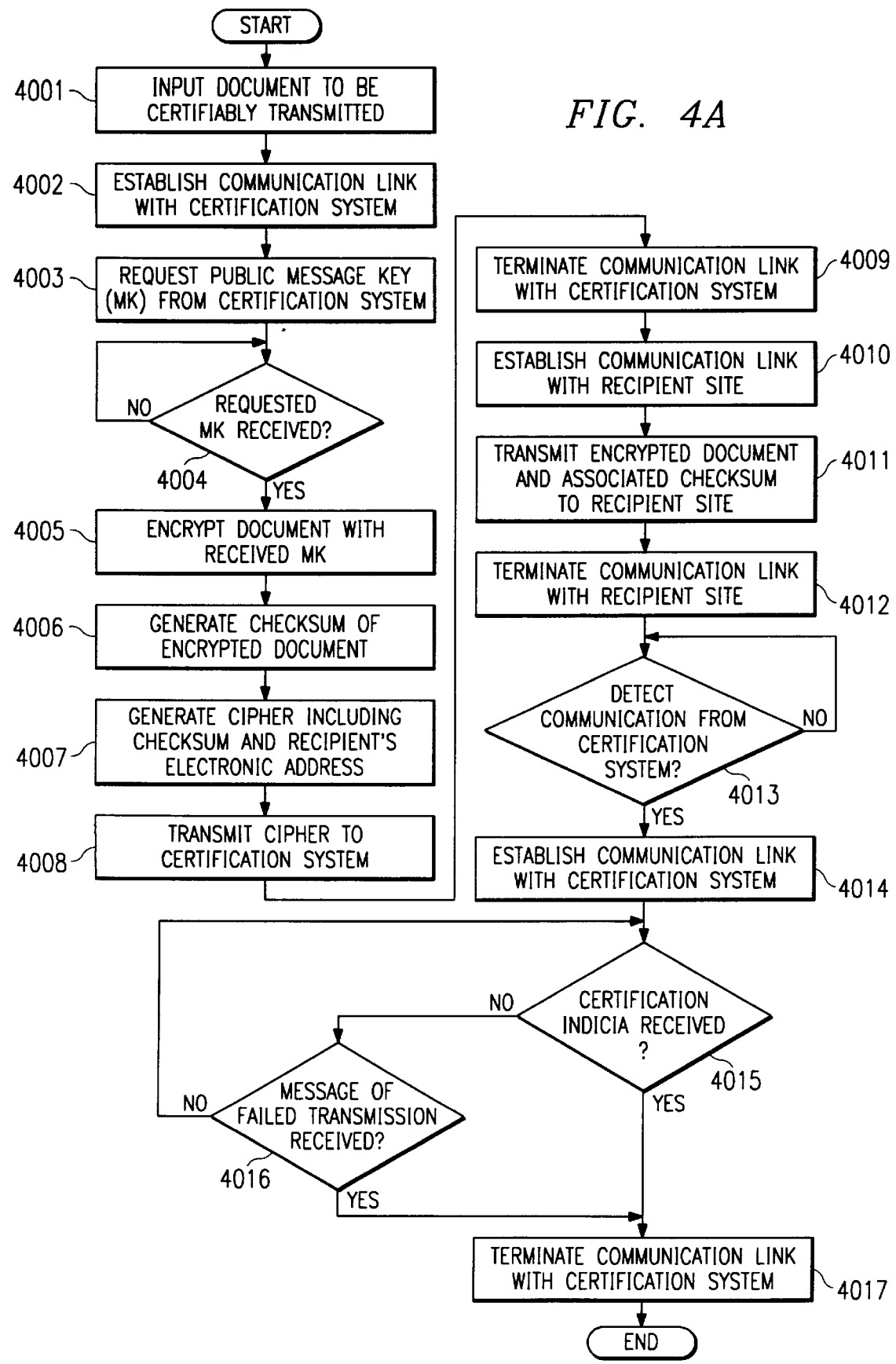
FIG. 4A illustrates a flow diagram of the sending processes of a preferred embodiment of the present invention wherein certification is accomplished through an independent processor-based system.
Figure 4B:
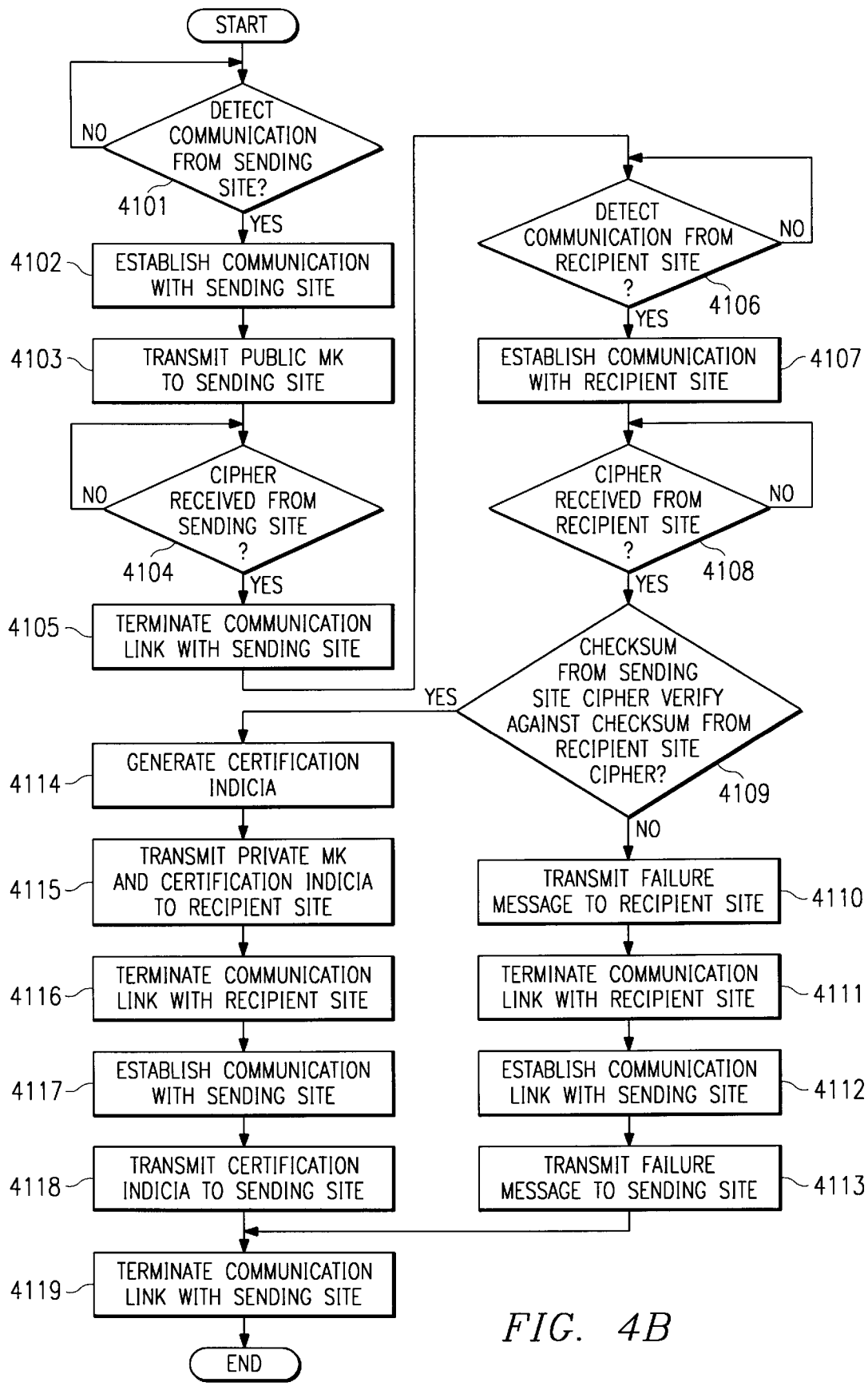
FIG. 4B illustrates a flow diagram of the independent certification process of a preferred embodiment of the present invention wherein certification is accomplished through an independent processor-based system.
Figure 4C:
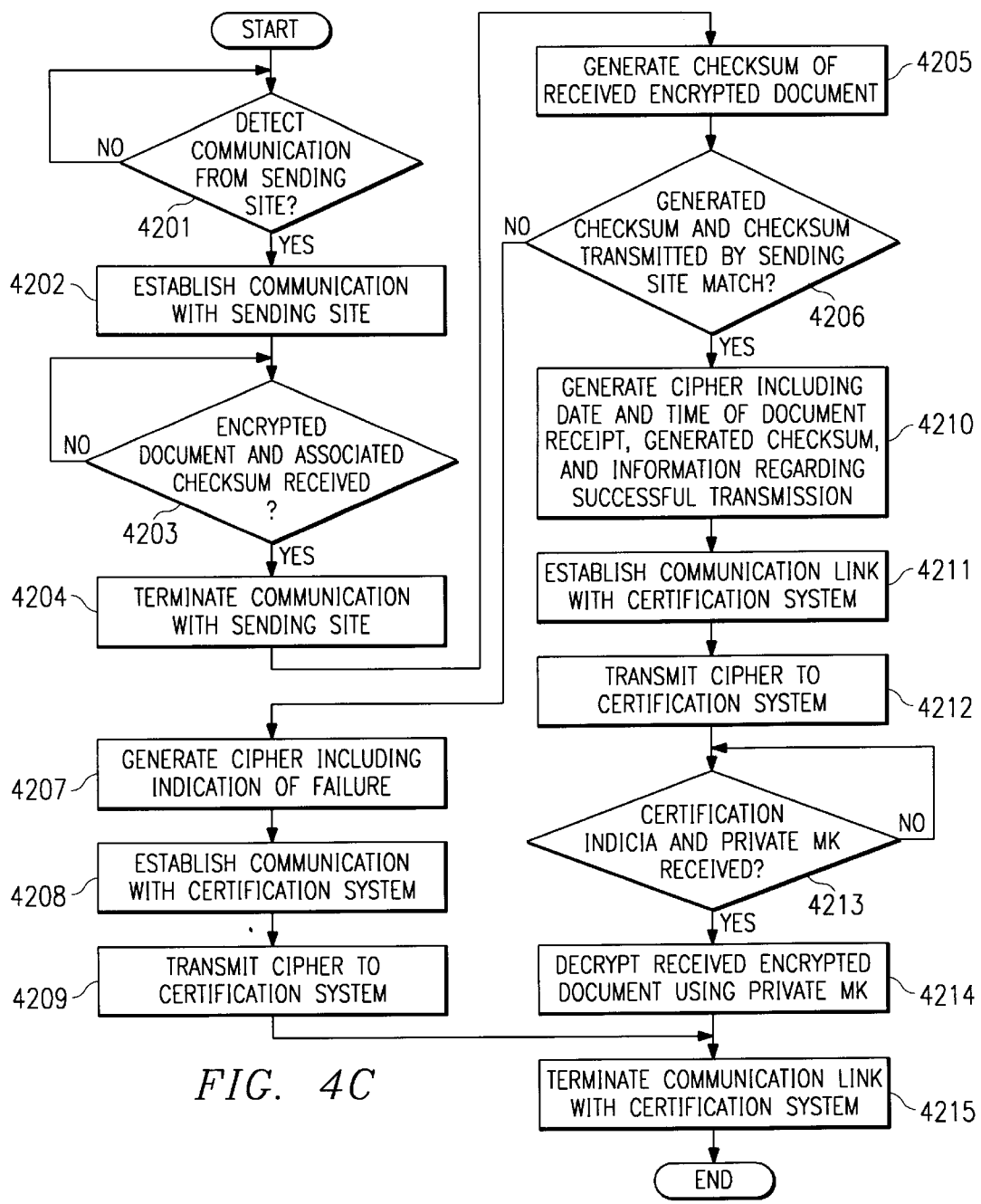
FIG. 4C illustrates a flow diagram of the receiving process of a preferred embodiment of the present invention wherein certification is accomplished through an independent processor-based system.
Figure 4D:
FIG. 4D illustrates the path of communications between the various components of a preferred embodiment of the present invention.

Transmission of a Document to be Certified Directly to a Recipient with Certification Provided by an Independent Certification System In a second preferred embodiment, the certified transmission of a document is accomplished by transmitting the document from a sending site directly to a recipient site with both the sending and recipient sites communicating independently with a certification system as illustrated in FIG. 4D. This system, like the above-described embodiment, uses a Send program executing on a first processor-based system (PC) to certifiably transmit a selected document stored on the first PC. Although the Send program communicates with a certification device to both receive a public MK and ultimately a certification indicia, unlike the above embodiment, the Send program directly communicates with the recipient. Through this direct communication with the recipient, the Send program transmits the encrypted electronic document.

As in the above embodiment, a cipher is transmitted by the Send program to a remote certification system. In the preferred embodiment, the remote certification system is again itself a second PC executing a Certification program. The Certification program receives ciphers from the sending and recipient sites and generates a certification indicia.

In the preferred embodiment, the recipient is a PC executing a Receive program. However, the Receive program, unlike the previous embodiment, is adapted for direct communication with the sending site. Upon verification of a successful transmission of an encrypted electronic document from the sending site, the Receive program transmits a cipher to the certification system, enabling the certification system to generate an indicia of certification. This indicia is to be transmitted to the sender for proof of certified transmission of an electronic document.

The certification indicia, along with the private MK, is transmitted to the recipient. The Receive program then utilizes the private MK to decrypt the received encrypted electronic document. Upon decryption, the Receive program integrates the certification indicia within the decrypted document for subsequent printing or storage.

Referring to FIG. 1, the illustrated processor-based systems 10, 20 and 30 may be utilized in the above-described second preferred embodiment of the present invention. As described above with reference to the first preferred embodiment, many variations of the system illustrated in FIG. 1 may be equally well suited for accomplishing the present invention.

Directing attention to FIG. 4A, a flow diagram of a preferred embodiment of the Send program utilizing the system illustrated in FIG. 1 is depicted. Upon activation of the Send program, the user is asked for, and the process accepts, an electronic document to be certifiably transmitted by the system (step 4001).

It shall be appreciated by one of skill in the art that the Send program may be executed in the form of a terminate and stay resident (TSR) program and therefore allow for the automatic association by the Send program of a document created within co-executing process. In a preferred embodiment, the Send program is capable of execution in a multi-tasking environment, such as the MICROSOFT WINDOWS operating environment, therefore providing the ability to select and transmit an electronic document created in a co-executing process as well as to integrate a received certification indicia within the original electronic document.

At step 4002 the Send program establishes a link between PCs 10 and 30. The link established in step 4002 is a link suitable for data communications between PCs 10 and 30, such as PSN 104 illustrated in FIG. 1. In the preferred embodiment, linking step 4002 includes the substeps of dialing a data communications access phone number, providing information as to which resource available through the data communications access is to be utilized, and verifying that data communications with a document transmission certification system has been accomplished.

As discussed previously, there is no limitation of the present invention establishing and terminating the communication link. For example, where a digital network system (not shown) is utilized for linking PCs 10 and 30, providing the ability for simultaneous communication between multiple processor-based system, a data communication link may advantageously be maintained for extended periods of time thereby eliminating the need to establish and terminate the communication link between PCs 10 and 30.

Upon establishing a link between PCs 10 and 30, the Send program requests a public message key (MK) from the certification system (step 4003). The public key so requested is part of a cryptographic key set stored in, or generated by, the certification system which includes at least one public cryptographic key and at least one corresponding private cryptographic key.

At step 4004 the Send program receives requested public MK transmitted by the certification system. This public MK is utilized by the Send program to encrypt the electronic document selected for certified transmission (step 4005). It shall be appreciated by one of skill in the art that an electronic document encrypted using an encryption key, such as the public MK, may only be decrypted using a corresponding decryption key, such as a private MK. Therefore, after encryption using the public MK, the Send program cannot decrypt the document without receiving a private MK from the certification system.

Depending on the form of the communication link between PCs 10 and 30, it may be advantageous to terminate the communication link between PCs 10 and 30 while preparing to transmit a send cipher. In such an embodiment, the Send program re-establishes the communication link between PCs 10 and 30 when prepared to transmit a send cipher.

At step 4006, the Send program generates a checksum of the encrypted document. This checksum, as well as additional information provided by the Send program, is combined into a cipher by the Send program at step 4007. In the preferred embodiment, the recipient's electronic address and identification information regarding the Send program is included in the cipher. However, other, or additional information may be included in the cipher such as identification of the sending site, date and time of transmission of the electronic document, a method of payment for certification of the transmission, or instructions for the certification system to archive a copy of the transmitted document, if desired. Furthermore, the inclusion of more than one recipient's electronic address in the cipher allows for multiple certified transmissions of a single electronic document.

Payment for certified transmission of electronic documents may be accomplished by the Send program deducting a value of the service from a credit stored in a portable memory coupled to PC 10. Such a portable memory, such as portable processor 16 illustrated in FIG. 2, and method for deducting a value from a credit stored within is taught in co-pending patent application Ser. No. 08/515,988, previously incorporated by reference. However, it shall be understood that the invention may be accomplished without any method of payment for the service being provided, if desired.

The Send program transmits the cipher to the certification system via the established communication link (step 4008). If desired, the cipher may be encrypted using cryptographic keys common to the Send program and the certification system to provide added security to the transmission. Encryption of the cipher may be advantageous in the case where the cipher includes sensitive information such as a method of payment.

After transmission of the cipher, the Send program terminates the communication link between PCs 10 and 30 to provide the ability to communicate with the recipient site (step 4009). Of course where PC 10 includes communication means capable of data communication between multiple remote processor-based systems simultaneously, termination of the communication link is not necessary to provide the ability to communicate with the recipient site.

At step 4010 the Send program establishes a communication link between PCs 10 and 20. The link established in step 4010 is a link suitable for data communications between PCs 10 and 20, such as PSN 104 illustrated in FIG. 1. In the preferred embodiment, linking step 4010 includes the substeps of dialing a data communications access phone number, providing information as to which resource available through the data communications access is to be utilized, and verifying that data communications with the desired recipient site has been accomplished.

As discussed above, there is no limitation of the present invention to establish and terminate the communication link between PCs 10 and 20. For example, where communications means allowing for communication with multiple processor-based systems simultaneously is provided, such as, for example, the Internet, or multiple communications means are provided, a data communication link between PCs 10 and 20 may advantageously be maintained simultaneously with a data communication link between PCs 10 and 30.

Upon establishing a link between PCs 10 and 20, the Send program transmits the encrypted electronic document and associated checksum to the recipient site (step 4011) and terminates communication with the recipient site (step 4012) to allow for communication with the certification system. Of course, where simultaneous communication is possible, it may be advantageous to maintain the communication link between PCs 10 and 20.

The Send program monitors data communications for the presence of the certification system (step 4013). When the Send program detects the presence of the certification site, such as by a ring indication at modem 101, a link capable of data communication is established at step 4014.

At step 4015 the Send program receives a certification indicia from the certification system which corresponds to the encrypted document transmitted to the recipient site in step 4010. The certification indica is the Send program's proof that the transmitted document was successfully transmitted to the recipient, and includes the exact date and time of receipt of the document. The indicia may be integrated into the original document by the Send program, or may be printed or stored for later proof of certified transmission of the electronic document.

However, if a message indicating failure of certified transmission is received instead of a certification indicia (step 4016), then the Send program terminates the communication link (step 4017). Of course, rather than terminating the communication link, the Send program may reattempt certified transmission of the document, if desired.

At step 4017 the Send program terminates the communication link between PCs 10 and 30. It shall be understood that, although the foregoing discussion disclosed the certified transmission of a single electronic document, that multiple electronic documents may be certifiably transmitted in any session. If desired, multiple electronic documents may be transmitted by returning to an earlier step, such as step 4010, to continue the process again rather than terminating the communication link as in step 4017.

Having explained in detail the Send program of this preferred embodiment, attention is directed to FIG. 4B wherein a flow diagram of a preferred embodiment of the Certification program is depicted. Upon execution of the Certification program, data communications are monitored for the presence of a sending site (step 4101). When the Certification program detects the presence of a sending site, such as by a ring indication at modem 103, a link capable of data communication is established at step 4102. As discussed in association with the Send program, in an alternative embodiment, where a digital network system (not shown) is utilized for linking PCs 10 and 20, providing the capability for simultaneous communication between multiple processor-based system, a data communication link may advantageously be maintained for extended periods of time thereby eliminating the need to establish and terminate the communication link between PCs 10 and 30.

At step 4103, the Certification program transmits a public MK to the sending site. The private MK is retained by the Certification program to prevent the sending site from being able to alter the electronic document once encrypted using the public MK.

After transmission of the public MK, the Certification program awaits receipt of a cipher from the sending site (step 4104). Depending on the form of the communication link established between PCs 10 and 30, it may be advantageous to terminate the communication link between PCs 10 and 30 while awaiting receipt of the cipher. In such an embodiment, the Certification program re-establishes the communication link between PCs 10 and 30 upon indication of incoming sending site communication, such as a ring indication at a modem 103, through which a communication link is established.

If encryption of the cipher is used, the additional substep of decrypting the cipher is necessary for meaningful use of its contents.

After receipt of the cipher, the Certification program terminates the communication link between PCs 10 and 30 (step 4105) to allow for communication between PCs 20 and 30. Of course where communication means are available that provide for simultaneous communication between multiple processor-based systems, then termination of the communication link at step 4105 may be avoided.

Where a payment method is included in the transmitted cipher, the Certification program utilizes this information to receive payment for the certification service performed. As discussed above in reference to the first preferred embodiment, such payment may involve the sending site having a credit or debit account with the certification provider or may utilize point of sale funding methods such as a valid bank card account.

Thereafter, at step 4106, the Certification program monitors data communications for the presence of a recipient site. When the Certification program detects the presence of a recipient site, as, for example, by a ring indication at modem 103, a link capable of data communication is established (step 4107) and the Certification program receives a cipher from the recipient site (step 4108).

Depending on the form of the communication link established between PCs 20 and 30, it may be advantageous to terminate the communication link between PCs 20 and 30 while preparing a certification indicia. In such an embodiment, the Certification program re-establishes the communication link between PCs 20 and 30 when prepared to transmit the certification indicia.

The electronic address of the recipient site, which may be included within the received cipher or provided as part of establishing a communication link between PCs 20 and 30, is matched to a cipher received from the sending site which includes the electronic address as a recipient site. A checksum of the encrypted document received by the recipient site is included within the cipher from the recipient site. This checksum is verified by the Certification program against a checksum received in the cipher from the sending site (step 4109).

If the checksum received from the recipient site does not verify with the checksum received from the sending site, a certified transmission cannot be completed, therefore, a message indicating certification failure is communicated to the sending and recipient sites. This message is sent by the Certification program transmitting a failure message to the recipient site (step 4110), terminating the communication link with the recipient site (step 4111), establishing a communication link with the sending site (step 4112), transmitting a failure message to the recipient site (step 4113), and terminating the communication link with the sending site (step 4119). It will be appreciated by those of skill in the art that a mismatch of the checksums indicates the electronic document originally encrypted by the sending site and the electronic document received by the recipient site are not identical.

After a valid match of the checksums, the Certification program generates a certification indicia (step 4114). The indicia generated by the Certification program is in a form suitable for transmission to both the Send and Recipient programs, as discussed in detail below.

The certification indicia includes information included in the ciphers received from both the sending site and the recipient site. Information included within the indicia include the date and time of receipt of the document by the recipient site, unique transaction identification information, the checksum of the encrypted document, and identification of the sending and recipient sites. To prevent the creation of a forged certification indicia, portions of the information included in the indica may be encrypted if desired. In one embodiment, the unique transaction identification information is encrypted for later verification of authenticity of a certification indicia.

At step 4115, the Certification program transmits a private MK and certification indicia to the recipient site. The transmitted private MK corresponds to the public MK previously transmitted by the Certification program to the sending site. Thereafter. the Certification program terminates the communication link with the recipient site (step 4116).

Upon establishing communication with the sending site (step 4117) the Certification program transmits the certification indicia to the sending site (step 4118). Where the cipher sent by the sending site includes multiple recipient's electronic addresses, the Certification program transmits a certification indicia to the sending site for each recipient to whom the document was certifiably transmitted.

In addition to transmitting the certification indicia to the sending and recipient sites, the Certification program may store a copy of the indicia within PC 30, such as, for example, on disk drive 33. Such a copy of the certification indicia may be later used to authenticate a copy of an indicia purporting to show certified transmission of an electronic document.

Upon completion of the steps above, the Certification program terminates the communication link with the sending site at step 4119. However, if desired, the Certification program may return to step 4101 and await communication from another sending site or, if multiple recipient electronic addresses are included in the cipher received from the sending site, return to step 4106 to await communication from another recipient site. Furthermore, one of skill in the art will appreciate that where PC 30 includes communications means allowing for multiple ones of PC 20 to communicate simultaneously, multiple ones of the above process may be occurring substantially simultaneously.

Having explained in detail the Send and Certification programs of this preferred embodiment of the present invention, attention is directed to FIG. 4C wherein a flow diagram of a preferred embodiment of the Receive program is depicted. It shall be appreciated by one of skill in the art that the Receive program, like the Send program, may be executed in the form of a TSR program and thereby allow for background utilization of the program as well as the utilization of the received document within a co-executing process. In a preferred embodiment, the Receive program is capable of execution in a multi-tasking environment, such as the MICROSOFT WINDOWS operating environment, thereby gaining the above identified advantages.

Upon execution of the Receive program, data communications are monitored for the presence of a sending site (step 4201). When the Receive program detects the presence of a sending site, a link capable of data communication, such as PSN 104 illustrated in FIG. 1, is established at step 4202. As discussed in association with the Send program, there is no limitation of the present invention to establish and terminate the communications link.

Upon establishing a link between PCs 10 and 20, the Receive program receives an encrypted electronic document and associated checksum transmitted by the sending site (step 4203). After transmission of the encrypted document, the Receive program terminates the communication link between PCs 10 and 20 to provide the ability to communicate with a certification system (step 4204). Of course, where PC 20 includes communication means capable of data communication between multiple remote processor-based systems simultaneously, termination of the communication link is not necessary to provide the ability to communicate with the recipient site.

The Receive program generates its own checksum of the received encrypted document (step 4205). This checksum is then verified against the checksum received from the sending site (step 4206). If the checksums do not match, a certified transmission cannot be completed, therefore, a cipher is generated to indicate failure of the certified transmission (step 4207). Thereafter, a communication link is established with the certification system (step 4208), the cipher is transmitted to the certification system (step 4209), and the communication link is terminated (step 4215). It will be appreciated by those of skill in the art that a mismatch of the transmitted checksum and the generated checksum indicates the electronic document originally encrypted by the sending site and the electronic document received by the Receive program are not identical.

After a valid match of the received checksum and generated checksum is determined, the Receive program combines this checksum with additional information provided by the Receive program into a cipher (step 4210). In the preferred embodiment, the date and time of receipt of the transmitted document as well as information indicating a match between the generated and received checksums are included in the cipher. However, other, or additional information may be included in the cipher such as information identifying the receiving station or instructions for the certification system to archive a copy of any certification indicia that may issue, if desired.

At step 4211 the Receive program establishes a link between PCs 20 and 30. The link established in step 4209 is a link suitable for data communications between PCs 20 and 30, such as PSN 104 illustrated in FIG. 1. In the preferred embodiment, linking step 4211 includes the substeps of dialing a data communications access phone number, providing information as to which resource available through the data communications access is to be utilized, and verifying that data communications with the desired recipient site has been accomplished. As previously discussed, there is no limitation of the present invention to establish and terminate the communication link.

Upon establishing a link between PCs 20 and 30, the Receive program transmits the cipher to the certification system (step 4212). If desired, the cipher may be encrypted using cryptographic keys common to the Receive program and the certification system to prevent unauthorized access to the information contained within the cipher. Encryption of the cipher may be advantageous in the case where the interception of and tampering with the cipher is a concern.

After transmission of the cipher the Receive program awaits receipt of a certification indicia and private MK from the certification system (step 4213). Depending on the form of the communication link established between PCs 20 and 30, it may be advantageous to terminate the communication link between PCs 20 and 30 while awaiting receipt of a certification indicia and private MK. In such an embodiment, the Receive program re-establishes the communication link between PCs 20 and 30 upon indication of incoming certification system communication, such as by a ring indication at a modem 102 through which a communication link is established.

The received private MK is then used to decrypt the transmitted document (step 4214). Thereafter the Receive program may incorporate the received certification indicia in the decrypted document. In such a case the certification indicia would appear in all copies, be they printed or electronic, of the transmitted document. Also, the received certification indicia may be stored by the Receive program for later comparison with a purported certification indicia present by the sender of a document.

Upon completion of the steps above, the Receive program terminates the communication link between PCs 20 and 30 at step 4215. If desired, additional certification indicia and their associated private MK may be received by returning to an earlier step such as step 4213 to continue the process again rather than terminate at step 4215.

Figure 5A:
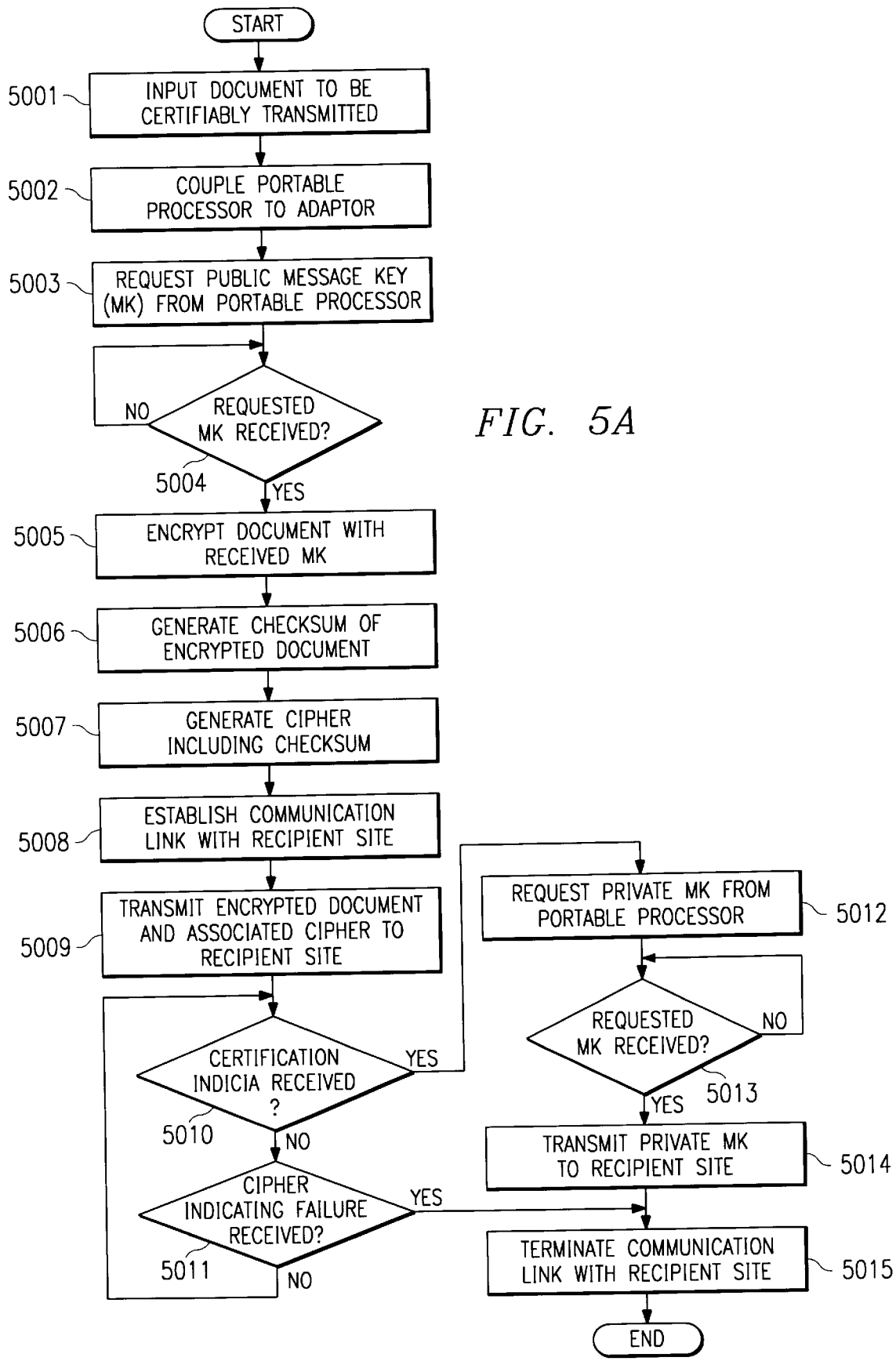
FIG. 5A illustrates a flow diagram of the sending processes of a preferred embodiment of the present invention wherein the sending processor-based system and receiving processor-based system accomplish certification of the transmitted document.
Figure 5B:
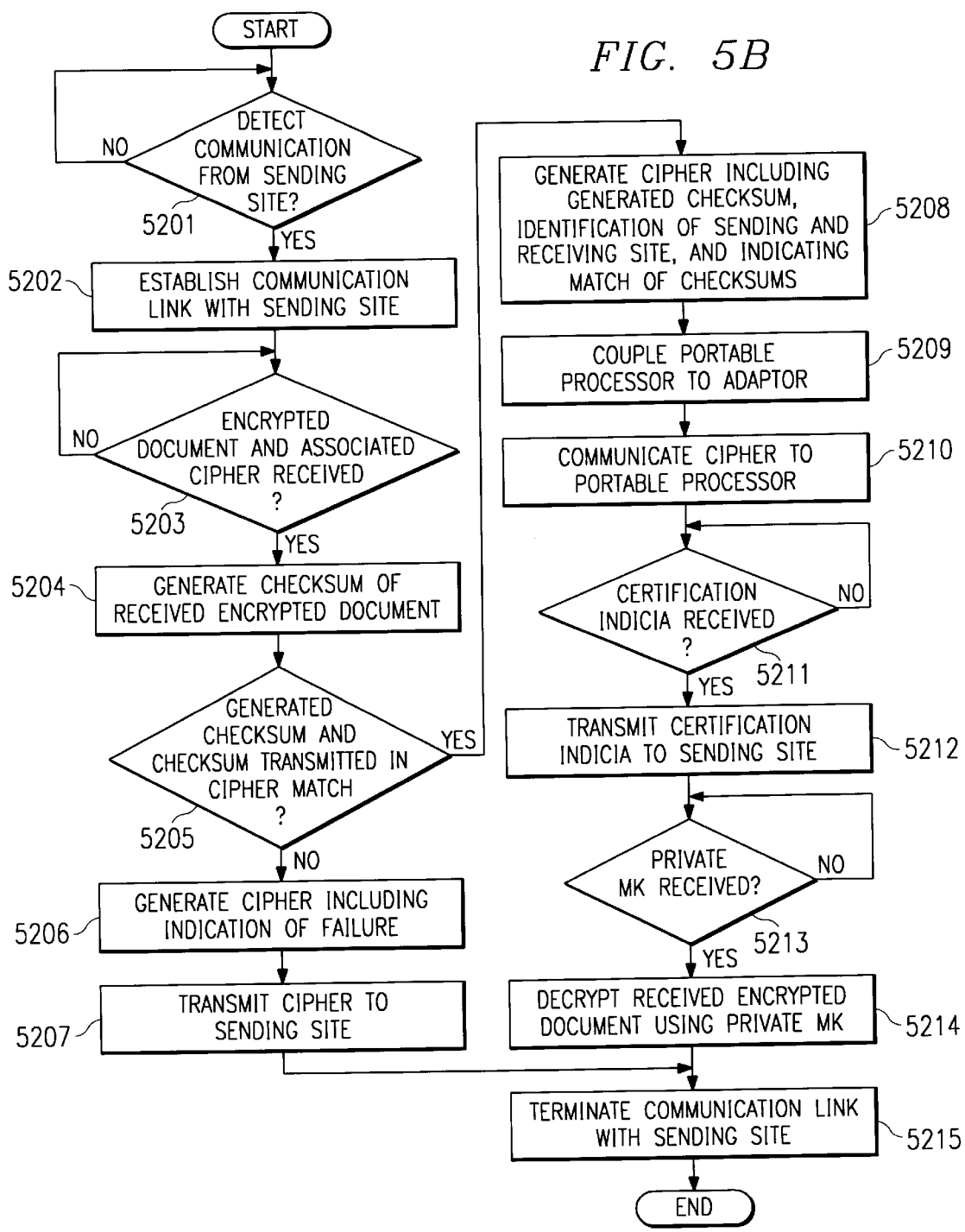
FIG. 5B illustrates a flow diagram of the receive process of a preferred embodiment of the present invention wherein the sending processor-based system and receiving processor-based system accomplish certification of the transmitted document.
Figure 5E:
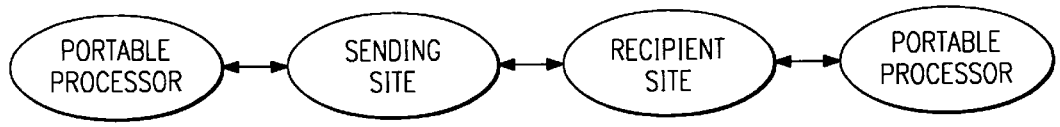
FIG. 5E illustrates the path of communications between the various components of a preferred embodiment of the present invention.
Figure 5C:
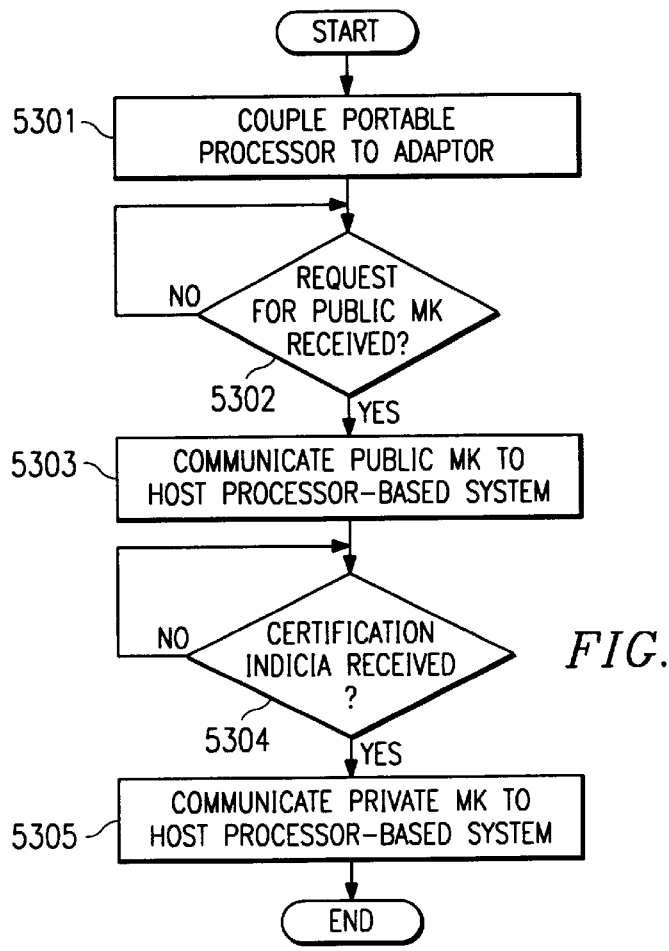
FIG. 5C illustrates a flow diagram of the cryptographic message key distribution process of a preferred embodiment of the present invention.
Figure 5D:
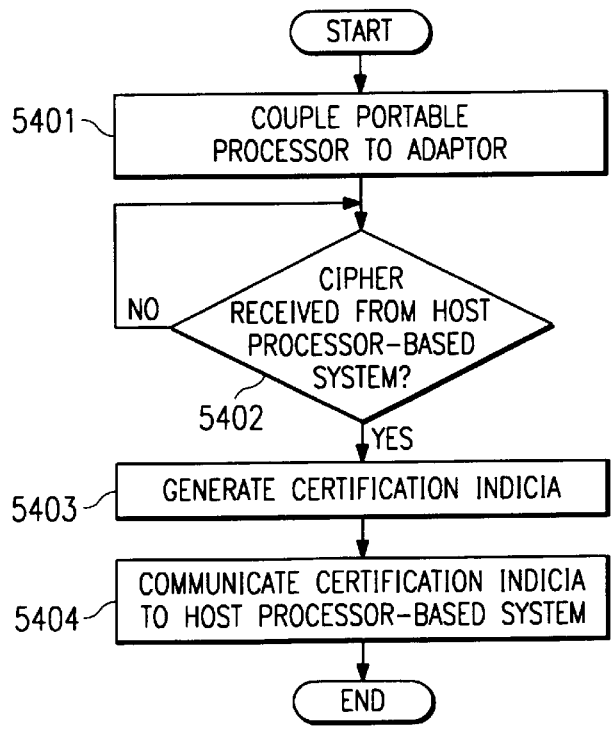
FIG. 5D illustrates a flow diagram of the certification process of a preferred embodiment of the present invention.

Transmission of a Document to be Certified Directly to a Recipient with Certification Provided by Portable Processors In a third preferred embodiment, the certified transmission of a document is accomplished by transmitting the document from a sending site directly to a recipient site with both the sending and recipient sites communicating independently with attached portable processors as illustrated in FIG. 5D. This system, like the above-described embodiments, uses a Send program executing on a first processor-based system (PC) to certifiably transmit a selected document stored on the first PC. Although the Send program communicates with a portable processor executing a program, hereinafter referred to as the "Key" program, to receive a public MK, the Send program directly transmits the document to the recipient.

Unlike the above embodiments, the Send program does not communicate with an independent certification system, but rather utilizes a coupled portable processor and associated Key program, in combination with a portable processor coupled to the recipient site executing a corresponding program, hereinafter referred to as the "Indicia" program, to certify a transmitted document. It shall be appreciated that a portable processor is used in this embodiment of the present invention because such a device provides the ability to distribute both public and private MKs as well as certification indicia in a very controlled manner without the need for an independent certification system.

In the preferred embodiment, the portable processor is a TMU button as disclosed in the above-referenced patent and co-pending application. The TMU button coupled to the sending site contains a processor and memory containing an algorithm for dispensing a public MK to the sending site and a private MK through the sending site to the recipient site. The TMU button coupled to the recipient site contains a processor and memory containing an algorithm for generating a certification indicia upon verification of ciphers generated by the sending and recipient sites. Although TMU buttons are in communication with the sending and recipient sites, the memory and algorithm contained within are not directly accessible to CPUs 12 and 22. Therefore, the TMUs provide a method of distributing the MKs and certification indicia without the need for a certification system.

In the preferred embodiment the recipient is a PC executing a Receive program. The Receive program is adapted for direct communication with the sending site and a portable processor. Upon verification of a successful transmission of an encrypted electronic document from the sending site, the Receive program transmits a cipher to the coupled portable processor, enabling the portable processor to generate an indicia of certification. The indicia is then transmitted through the recipient site to the sender for proof of certified transmission of an electronic document and to enable transmission of a private MK from the portable processor coupled to the sending site.

The Receive program then utilizes the private MK to decrypt the received encrypted electronic document. Upon decryption, the Receive program integrates the certification indicia within the decrypted document for subsequent printing.

Referring to FIG. 2, there are illustrated processor-based systems 10 and 20 utilized in the above-described preferred embodiment of the present invention. Specifically, PC 10 is utilized to implement the aforementioned Send program and PC 20 is utilized to implement the Receive program. PC 10 includes chassis 11 enclosing processor (CPU) 12 and disk drive 13. Furthermore, PC 10 is adapted for communication with portable processor 16 through adaptor 15. PC 20 includes chassis 21 enclosing CPU 22 and disk drive 23 as well as being adapted for communication with portable processor 26 through adaptor 25. PCs 10 and 20 are general purpose computers, such as an IBM compatible (or Apple Macintosh) controlled by any general purpose operating system such as DOS or UNIX. It should be noted that PCs 10 and 20 may be computers of differing types and/or controlled by differing operating systems.

Still referring to FIG. 2, it can be seen that PCs 10 and 20 may be linked together through Public Switched Network (PSN) 104 via modems 101 and 102. PSN 104 may be comprised of any number of now existing or later to be developed communications means. In the preferred embodiment, PSN 104 comprises public telecommunications lines and switching equipment. Alternatively, PSN 104 comprises digital communication over the Internet or similar wide area public gateway. Additionally, PCs 10 and 20 may be linked directly through digital telecommunications trunks (not shown) or through a digital network system (not shown). It shall be understood that, in utilizing a digital network system to link PCs 10 and 20, modems 101 and 102 are replaced by network interface cards (NIC) or other digital communications devices, e.g., ISDN. It will be appreciated by those of skill in the art that any network linking PCs 10 and 20 may either be secure or not, depending on the degree of security desired with respect to the transmission of the document to be certified.

With further reference to PC 20 illustrated in FIG. 2, printer 24 is depicted. Printer 24 is coupled to CPU 22 and provides printing means for the received certified document and indicia of certification. Of course, printer 24 is optional, and certified transmission of a document may be accomplished without the need for printing the received document.

Directing attention to FIG. 5A, a flow diagram of a preferred embodiment of the Send program utilizing the system illustrated in FIG. 2 is depicted. Upon activation of the Send program, the user is asked for, and the process accepts, an electronic document to be certifiably transmitted by the system (step 5001).

It shall be appreciated by one of skill in the art that the Send program may be executed in the form of a terminate and stay resident (TSR) program and therefore allow for the automatic association by the Send program of a document created within co-executing process. In a preferred embodiment, the Send program is capable of execution in a multi-tasking environment, such as the MICROSOFT WINDOWS operating environment, therefore providing the ability to select and transmit an electronic document created in a co-executing process as well as to integrate a received certification indicia within the original electronic document.

At step 5002 portable processor 16 is coupled to adaptor 15 to provide data communications between PC 10 and portable processor 16. In the preferred embodiment, coupling step 5002 includes the substep of verifying that portable processor 16 is a portable processor suitable for use in certifiably transmitting an electronic document.

It shall be understood that coupling portable processor 16 to PC 10 may be accomplished at a point in the process other than that illustrated in FIG. 5A. Furthermore, there is no limitation of the present invention to couple and decouple portable processor 16.

After coupling portable processor 16 to PC 10, the Send program requests a public message key (MK) from portable processor 16 (step 5003). The public key so requested is part of a cryptographic key set stored in, or generated by, the portable processor which includes at least one public cryptographic key and at least one corresponding private cryptographic key. At step 5004 the Send program receives requested public MK communicated by the portable processor.

The public MK is utilized by the Send program to encrypt the electronic document selected for certified transmission (step 5005). It shall be appreciated by ones of skill in the art that an electronic document encrypted using a public cryptographic key, such as the public MK, may only be decrypted using a corresponding decryption key, such as a private MK. Therefore, after encryption using the public MK, the Send program cannot decrypt the document without receiving a private MK from portable processor 16.

At step 5006, the Send program generates a checksum of the encrypted document. This checksum, as well as additional information provided by the Send program, is combined into a cipher by the Send program at step 5007. In the preferred embodiment, the recipient's electronic address and identification information regarding the Send program is included in the cipher. However, other, or additional, information may be included in the cipher such as date and time of transmission of the electronic document or number of pages in the document to be transmitted, if desired.

At step 5008 the Send program establishes a link between PCs 10 and 20. The link established in step 5008 is a link suitable for data communications between PCs 10 and 20, such as PSN 104 illustrated in FIG. 2. In the preferred embodiment, linking step 5008 includes the substeps of dialing a data communications access phone number, providing information as to which resource available through the data communications access is to be utilized, and verifying that data communications with the desired recipient site has been accomplished. It shall be understood that there is no limitation of the present invention to establish and terminate the communications link where communications means are utilized that advantageously may be maintained for extended periods of time.

Upon establishing a link between PCs 10 and 20, the Send program transmits the encrypted electronic document and associated cipher to the recipient site (step 5009) and awaits communication of a certification indicia from the recipient site (step 5010). Depending on the form of the communication link established between PCs 10 and 20, it may be advantageous to terminate the communication link between PCs 10 and 20 while awaiting the receipt of a certification indicia. In such an embodiment, the Send Program re-establishes the communication link between PCs 10 and 20 when communication from the recipient site is detected.

The certification indica is the Send program's proof that the transmitted document was successfully transmitted to the recipient, and includes the exact date and time of receipt of the document. The indicia may be integrated into the original document by the Send program, or may be printed or stored for later proof of certified transmission of the electronic document. If desired, the communication between the Send program and the recipient site may be encrypted using cryptographic keys common to the Send program and the recipient site to provide added security to the transmission. Encryption of this communication requires the additional substeps of encrypting any information to be communicated through the communication link as well as decrypting any information received through the communication link.

Upon the Send program receiving a certification indicia from the recipient site at step 5010, the Send program requests a private MK from portable processor 16, which corresponds to the public MK used to encrypt the transmitted document by communicating the certification indicia to portable processor 16 (step 5012). Again, depending on the form of the communication link between PCs 10 and 20, it may be advantageous to terminate the communication link while preparing to transmit a private MK. The private MK is received at step 5013 and is transmitted to the recipient site to enable the decryption of the transmitted document at step 5014. However, if a cipher is received indicating failure of the certified transmission (step 5011), rather than a certification indicia, then the Receive program terminates the communication link (step 5015).

Of course where use of the private MK by PC 10 is a concern, private MK may be blindly transmitted by the Send program from portable processor 16 to the recipient site, if desired. Alternatively, the private MK may be encrypted by portable processor 16 using a cryptographic key set common to portable processor 16 and the recipient site.

In an alternative embodiment, payment for certified transmission of electronic document may be accomplished by portable processor 16 deducting a value of the service from a credit stored within portable processor 16 coupled to PC 10. It shall be understood that a certification indicia communicated by the Send program to portable processor 16 indicates a successful certified transfer of the encrypted electronic document. Therefore, the portable processor is able to properly determine that a certified transmission has in fact occurred and may properly deduct the cost of such a transaction from the credit stored therein. Such a portable memory and method for deducting a value from a credit stored within is taught in co-pending patent application Ser. No. 08/515,988, previously incorporated by reference. However, it shall be understood that the invention may be accomplished without any method of payment for the service being provided, if desired.

At step 5015 the Send program terminates the communication link between PCs 10 and 20. It shall be understood that, although the foregoing discussion disclosed the certified transmission of a single electronic document, multiple electronic documents may be certifiably transmitted in any session. If desired, multiple electronic documents may be transmitted to the same recipient site by returning to an earlier step, such as step 5009, to continue the process again without terminating the communication link. Furthermore, multiple electronic documents may be transmitted to different recipient sites by returning to an earlier step, such as step 5008, after terminating the communication link to establish communication with another recipient site.

Having explained in detail the Send program of this preferred embodiment of the present invention, attention is directed to FIG. 5B wherein a flow diagram of a preferred embodiment of the Receive program is depicted. It shall be appreciated by one of skill in the art that the Receive program, like the Send program, may be executed in the form of a TSR program and therefore allow for background utilization of the program as well as the utilization of the received document within co-executing process. In a preferred embodiment, the Receive program is capable of execution in a multi-tasking environment, such as the MICROSOFT WINDOWS operating environment, also providing the above-described advantages.

Upon execution of the Receive program, data communications are monitored for the presence of a sending site (step 5201). When the Receive program detects the presence of a sending site, a link capable of data communication, such as PSN 104 illustrated in FIG. 2, is established at step 5202. As discussed in association with the Send program, there is no limitation of the present invention to establish and terminate the communications link. For example, in an alternative embodiment, where a digital network system (not shown) is utilized for linking PCs 10 and 20, a data communication link may advantageously be maintained for extended periods of time.

Upon establishing a link between PCs 10 and 20, the Receive program receives an encrypted electronic document and associated cipher transmitted by the sending site (step 5203). Depending on the form of communication link established between PCs 10 and 20, it may be advantageous to terminate the communication link between PCs 10 and 20 while preparing to transmit a certification indicia. In such an embodiment, the Receive program re-establishes the communication link between PCs 10 and 20 when prepared to transmit a certification indicia. After transmission of the encrypted document and cipher, the Receive program generates its own checksum of the received encrypted document (step 5204). This checksum is then verified against the checksum received in the cipher from the sending site (step 5205). If the checksums do not match, a certified transmission cannot be completed, therefore, a cipher is generated to indicate failure of the certified transmission (step 5206) and transmitted to the sending site (step 5207). Thereafter, the communication link is terminated (step 5215). It will be appreciated by those of skill in the art that a mismatch of the transmitted checksum and the generated checksum indicates the electronic document originally encrypted by the sending site and the electronic document received by the Receive program are not identical.

After a valid match of the received checksum and generated checksum is determined, the Receive program combines this checksum with additional information provided by the Receive program into a cipher (step 5208). In the preferred embodiment information indicating a match between the generated and received checksums, as well as information identifying the sending and receiving sites, are included in the cipher. The date and time of receipt of the transmitted document as well as unique transaction information to be included within a generated certification indicia are provided by portable processor 26. However, other, or additional information may be included in the cipher or provided by portable processor 26, if desired.

At step 5209 portable processor 26 is coupled to adaptor 25 to provide data communications between PC 20 and portable processor 26. In the preferred embodiment, coupling step 5209 includes the substep of verifying that portable processor 26 is a portable processor suitable for use in certifiably transmitting an electronic document. It shall be understood that coupling portable processor 26 to PC 20 may be accomplished at a point in the process other than that illustrated in FIG. 5B. Furthermore, there is no limitation of the present invention to couple and decouple portable processor 26.

After coupling portable processor 26 to PC 20, the Receive program communicates the generated cipher to portable processor 26 (step 5210). Portable processor 26 then returns a certification indicia to the Receive program (step 5211). The certification indicia may be stored by the Receive program for later comparison with a purported certification indicia present by the sender of a document. The indicia may also be incorporated within the received document when encrypted to appear as an integral part of the document. In such a case the certification indicia would appear in all copies, be they printed or electronic, of the transmitted document.

A copy of the certification indicia is transmitted to the sending site (step 5212). If desired, the certification indicia may be encrypted using cryptographic keys common to the Receive program and the sending site to prevent unauthorized access to the certification indicia.

After transmission of the certification indicia the Receive program awaits receipt of a private MK from the sending site (step 5213). Again, depending on the form of the communication link established between PCs 10 and 20, it may be advantageous to terminate the communication link between PCs 10 and 20 while awaiting receipt of a private MK. In such an embodiment, the Receive program re-establishes the communication link between PCs 10 and 20 upon indication of incoming certification system communication, such as a ring indication at a modem 102, through which a communication link is established.

The received private MK may then be used to decrypt the transmitted document (step 5214).

Upon completion of the steps above, the Receive program terminates the communication link between PCs 10 and 20 at step 5215. If desired, additional certification indicia may be transmitted and their associated private MK may be received by returning to an earlier step such as step 5208 to continue the process again rather than terminate at step 5215.

Having explained in detail the Send and Receive programs of this preferred embodiment of the present invention, attention is directed to FIG. 5C wherein a flow diagram of a preferred embodiment of a Key program is depicted. It shall be appreciated by one of skill in the art that the Key program is an algorithm contained within portable processor 16 and is the sole means by which private or public MKs may be communicated to PC 10. Although the Key program operates in response to communication from PC 10, the Key program and its associated cryptographic keys are impervious to direct control by PC 10.

At step 5301 portable processor 16 is coupled to adaptor 15 to provide data communications between PC 10 and portable processor 16. It shall be understood that coupling portable processor 16 to PC 10 may be accomplished at a point in the process other than that illustrated in FIG. 5C. Furthermore, there is no limitation of the present invention to couple and decouple portable processor 16.

After coupling portable processor 16 to PC 10, the Key program awaits a request for a public message key (MK) from PC 10 (step 5302). The public key so requested is part of a cryptographic key set stored in, or generated by, the portable processor which includes at least one public cryptographic key and at least one corresponding private cryptographic key. Generation algorithms for cryptographic keys are well known in the art and will not be further discussed here. For the purposes of the present invention, any such known method which results in cryptographic key sets capable of communication between portable processor 16 and PC 10, as well as between PCs 10 and 20, may be utilized.

At step 5303 the Key program communicates the requested public MK to PC 10. Thereafter, the Key program awaits the communication of a certification indicia by PC 10 (step 5304).

Upon receipt of a certification indicia, the Key program communicates a private MK corresponding to the previously communicated public MK to PC 10 (step 5305). As discussed above in reference to the Send program, where use of the private MK by PC 10 is a concern, the private MK may be encrypted by portable processor 16 using a cryptographic key set common to portable processor 16 and the recipient site.

Thereafter, portable processor 16 may be de-coupled from PC 10. However, if multiple electronic documents are to be certifiably transmitted in any session, multiple MKs may be communicated to PC 10 by returning to an earlier step, such as step 5302, to continue the process again without de-coupling processor 16.

Having explained in detail the Send, Receive and Key programs of this preferred embodiment of the present invention, attention is directed to FIG. 5D wherein a flow diagram of a preferred embodiment of the Indicia program is depicted. It shall be appreciated by one of skill in the art that an Indicia program, like the Key program, is an algorithm contained within portable processor 26 and is the means by which a certification indicia is communicated to PCs 10 and 20. Although the Indicia program operates in response to communication from PC 20, the Indicia program and its generation of certification indicia are impervious to direct control by PC 20.

At step 5401 portable processor 26 is coupled to adaptor 25 to provide data communications between PC 20 and portable processor 26. Coupling portable processor 26 to PC 20 may be accomplished at a point in the process other than that illustrated in FIG. 5D. Furthermore, there is no limitation of the present invention to couple and decouple portable processor 26.

After coupling portable processor 26 to PC 20, the Indicia program awaits a cipher from PC 20 (step 5402). Information contained within the received cipher, as well as current date and time and unique transaction information provided by portable processor 26, is used to generate a certification indicia (step 5403). The resulting certification indicia is communicated to PC 20 (step 5404).

Thereafter, portable processor 26 may be de-coupled from PC 20. However, if multiple electronic documents are to be certifiably transmitted in any session, multiple certification indicia may be communicated to PC 20 by returning to an earlier step, such as step 5402, to continue the process again without de-coupling processor 26.

Although a preferred embodiment wherein two portable processors are utilized to certifiably transmit an electronic document has been discussed, it shall be understood that a single portable processor may advantageously be used. In an alternative embodiment, a single portable processor 16 coupled to PC 10 is utilized to execute both the Key and Indicia programs and, therefore, to distribute both the MKs as well as the certification indicia. In such an embodiment the Receive program transmits the generated cipher through PC 10 to portable processor 16 for the generation of a certification indicia. This certification indicia is then communicated to the Send program and the certification indicia and a private MK are transmitted to the Receive program. Of course the single portable processor could also be portable processor 26 coupled to PC 20 if desired.

Certification Indicia

Having described in detail preferred embodiments of the certification system and their associated certification indicia, detailed reference to the certification indicia will now be made. PC 30 or portable processor 16, depending on the embodiment of the present invention, provide a secure processor by which information contained within the received ciphers may be converted into a form known as a security packet. The secure processor uses internal math coprocessor hardware, encryption software algorithms and encryption keys to produce the security packet using information the received ciphers. In the preferred embodiment, the date and time of receipt of the transmitted document, the checksum of the document, unique transaction identification, as well as information identifying the sending and recipient sites are included in the security packet. However, other, or additional information may be included, if desired.

The encryption algorithms can advantageously be RSA public/private key but might be changed at any time related to security issues. Indeed, this security packet, produced in the secret and secure environment of the portable processor, becomes indecipherable to the outside world, including the processor-based systems, PCs 10 and 20. The only other entity which should have knowledge of the keys to be able to decrypt this packet would be the postal authority or other communication certification authority.

The security packet is transmitted to the various processor-based systems involved in the certified transmission of the electronic document as an electronic representation of a certification indicia. This indecipherable security packet is then handled blindly by the Send and Receive programs to the point where it is passed on to a software function within the program which will encode security packet into a form suitable for printing or incorporation within the electronic document.

The form of the security packet may be information suitable for enabling the Send and Receive programs to generate a suitable printed certification indicia. However, to decrease the possibility of fraudulent certification indicia being generated, the security packet may be a digital graphic representation of the certification indicia to ultimately be printed.

Figure 6A:
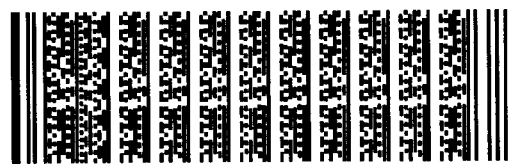
FIG. 6A illustrates a preferred embodiment of the certification indicia in the form of a bar code.

The form of the resulting certification indicia may be a human readable image including the above listed information. However, to prevent the production of fraudulent certification indicia, the form of the indicia may be a bar code image as illustrated in FIG. 6A. Furthermore, a variety of information may be included within the certification indicia using bar code symbol technology. Such information would be machine readable and can be used to identify certification indicia forgeries.

The standard bar code contains white and dark areas in the form of bars that can be read by a laser scanner. The laser scanner illuminates the white and dark areas with a light of a certain frequency. The light is reflected back to the laser scanner in such a way as to indicate the pattern of white and black areas within the bar code. Since white areas reflect much more light than dark areas do, a perpendicular scan of the bar code will allow the scanner to translate the reflected light into the coded information. More than 20 linear bar code languages have been developed, each with its own specifications for how many bars and spaces make up a character, how characters are to be arranged, whether the characters can be letters as well as numbers, and so forth. The most widely-used bar code is the Universal Product Code (UPC) seen on everyday grocery items.

More sophisticated graphical security interfaces have been developed over the last decade, such as Intermec Corporations' Code 49 and Laserlight System Inc.'s Code 16K. A major advantage of these more sophisticated graphical security interfaces is that they contain an error-correction formula which can often recover the entire message even if parts of the code have been torn or damaged.

Figure 6B:
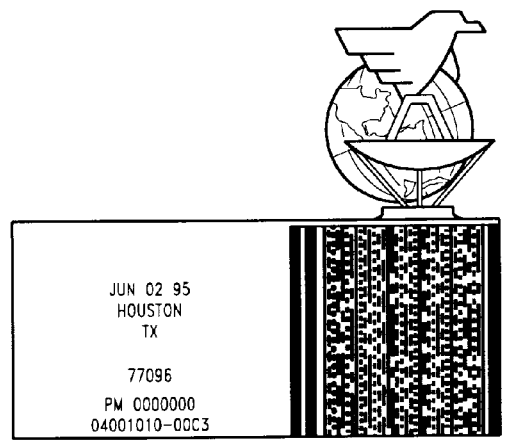
FIG. 6B illustrates an alternative embodiment of the certification indicia including human readable information.

In the case of bar code being used, the Indicia or Send and Receive programs may take this bar code image and include certain other unencrypted information for the visual identification of the certification indicia as illustrated in FIG. 6B.

Figure 6C:
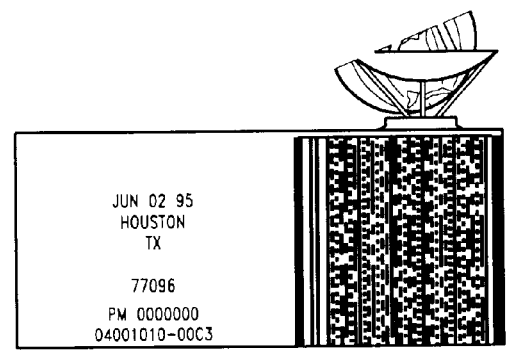
FIG. 6C illustrates an alternative embodiment of the certification including a partial graphical image.
Figure 6D:
FIG. 6D illustrates a graphical image used to complete a certification indicia including only a partial graphical image.

Furthermore, the certification indicia may be generated including a partial graphic image, as illustrated in FIG. 6C, or other such incomplete form. The respective Send and Receive programs, having unique knowledge of the transmission of the document, may then predict the image with which to complete the certification indicia by using a properly matching partial image, as illustrated in FIG. 6D. Such a system would result in the ultimate printing of a complete image, as illustrated in FIG. 6B, and providing protection from forged certification indicia.

Although the present invention and its advantages have been described in detail, it should be understood that various changes, substitutions and alterations can be made herein without departing from the spirit and scope of the invention as defined by the appended claims.

What is claimed is:

1. A system for certifiably transmitting an electronic document from a first processor-based system to a second processor-based system, said system comprising:
    a first processor-based system having an electronic document stored therein, said first system also having means for summarily indicating the content of said electronic document;
    a second processor-based system having means for storing a received electronic document, said second system also having means for summarily indicating the content of said received electronic document, said second system further having means for comparing said first system's summary indication of the content of said electronic document and said second system's summary indication of the content of said received electronic document;
    a third processor-based system having means for creating a certification indicia, said certification indicia being created only upon said comparing means indicating said first and second system's summary indication of the content of said electronic document, wherein said certification indicia comprises information selected from the group consisting of an electronic image suitable for printing by said second system and data suitable to enable said first and second systems to generate an electronic image suitable for printing;
    first means for information communication between said first system and said third system; and
    second means for information communication between said second system and said third system.

2. The system of claim 1, wherein said electronic document is transmitted from said first system to said second system through said third system.

3. The system of claim 1, wherein said means for creating said certification indicia further comprises means for creating a unique certification indicia for each page of said electronic document.

4. The system of claim 1, wherein said third system further comprises means for transmitting said created certification indicia to said first system.

5. The system of claim 1, wherein said third system further comprises means for transmitting said created certification indicia to said second system.

6. The system of claim 1, wherein said second system further comprises:
    means for integrating said created certification indicia into said decrypted electronic document; and
    means for printing said integrated decrypted electronic document and generated certification indicia.

7. The system of claim 1, wherein said first information communication means comprises a public switch telephone network.

8. The system of claim 1, wherein said first information communication means comprises the Internet.

9. The system of claim 1, wherein said first information communication means comprises transmission via a cable system.

10. The system of claim 1, wherein said second information communication means comprises a public switch telephone network.

11. The system of claim 1, wherein said second information communication means comprises the Internet.

12. The system of claim 1, wherein said second information communication means comprises transmission via a cable system.

13. The system of claim 1, wherein said electronic image comprises encrypted information.

14. The system of claim 1, wherein said encrypted information comprises a machine readable bar code.

15. The system of claim 1, wherein said generated electronic image comprises encrypted information.

16. The system of claim 1, further comprising third means for information communication between said first system and said second system.

17. The system of claim 16, wherein said electronic document is transmitted from said first system to said second system via said third communication means.

18. The system of claim 16, wherein said third information communication means comprises a public switch telephone network.

19. The system of claim 16, wherein said third information communication means comprises the Internet.

20. The system of claim 16, wherein said third information communication means comprises transmission via a cable system.

21. The system of claim 1, wherein said electronic document stored in said first system is an encrypted copy of a clean text document.

22. The system of claim 21, wherein said third system comprises a cryptographic key set, said key set having at least an encryption key and a decryption key corresponding to said encryption key, said encryption key being provided to said first system for encryption of said clean text document, said decryption key being provided to said second system for decryption of said received encrypted document.

23. A system for certifiably transmitting an electronic document from a first processor-based system directly to a second processor-based system, said system comprising:
    a first processor based system;
    a second processor based system;
    means for information communication between said first system and said second system;
    said first system comprising:
        an electronic document stored therein;
        means for summarily indicating the content of said electronic document; and
        means for transmitting said electronic document and said summary indication of the content to said second system;
    said second system comprising:
        means for storing said received electronic document and said summary indication of the content;

means for summarily indicating the content of said received electronic document;

means for comparing said first system's summary indication of the content of said electronic document and said second system's summary indication of the content of said received electronic document;

means for creating a certification indicia, said certification indicia being created only upon said comparing means validating said first and second system's summary indication of the content of said electronic document; and means for transmitting said created certification indicia to said first system.

24. The system of claim 23, wherein said electronic document stored in said first system is an encrypted copy of a clean text document.

25. The system of claim 23, wherein said means for creating said certification indicia further comprises means for creating a unique certification indicia for each page of said electronic document.

26. The system of claim 23, wherein said second system further comprises:

means for integrating said created certification indicia into said decrypted electronic document; and means for printing said integrated decrypted electronic document and generated certification indicia.

27. The system of claim 23, wherein said information communication means comprises a public switch telephone network.

28. The system of claim 23, wherein said first communication information means comprises the Internet.

29. The system of claim 23, wherein said first communication information means comprises transmission via a cable system.

30. The system of claim 23, wherein said second communication information means comprises a public switch telephone network.

31. The system of claim 23, wherein said second communication information means comprises the Internet.

32. The system of claim 23, wherein said second communication information means comprises transmission via a cable system.

33. The system of claim 23, wherein said certification indicia comprises data suitable to enable said first and second systems to generate an electronic image suitable for printing.

34. The system of claim 33, wherein said generated electronic image comprises encrypted information.

35. The system of claim 23, wherein said certification indicia comprises an electronic image suitable for printing by said second system.

36. The system of claim 35, wherein said electronic image comprises encrypted information.

37. The system of claim 36, wherein said encrypted information comprises a machine readable bar code.

38. The system of claim 23, wherein said first system further comprises a first portable processor removably coupled thereto.

39. The system of claim 38, wherein said first portable processor is a TMU button.

40. The system of claim 38, wherein said first portable processor comprises a cryptographic key set, said key set having at least an encryption key and a decryption key corresponding to said encryption key, said encryption key being utilized for encryption of said clean text document, said decryption key being utilized by said second system for decryption of said received encrypted document.

41. The system of claim 23, wherein said second system further comprises a second portable processor coupled thereto, said second portable processor comprising said means for creating a certification indicia.

42. The system of claim 41, wherein said second portable processor is a TMU button.

43. A system for certifiably transmitting an electronic document from a first processor-based system directly to a second processor-based system, said system comprising:

a first processor-based system;

a second processor-based system; and means for information communication between said first system and said second system;

said first system comprising:

means for identifying an electronic document to certifiably transmit;

means for encrypting said electronic document;

means for generating a checksum of said encrypted electronic document;

means for transmitting said encrypted electronic document and said generated checksum via said communication means to said second system; and means for receiving a certification indica via said communication means from said second system;

said second system comprising:

means for receiving said encrypted electronic document and said checksum from said first system;

means for generating a checksum of said received encrypted electronic document;

means for determining if said generated checksum and said received checksum are the same;

means for generating said certification indicia if said generated checksum and said received checksum are the same; and means for transmitting said certification indicia to said first system.

44. The system of claim 43, wherein said encrypting means comprises a first portable processor coupled to said first system.

45. The system of claim 44, wherein said first portable processor is a TMU button.

46. The system of claim 43, wherein said means for generating said certification indicia further comprises:

means for generating a certification indicia for each page of said electronic document; and means for integrating the certification indicia associated with a particular page of said electronic document with that particular page of said electronic document.

47. The system of claim 43, wherein said information communication means comprise a public switch telephone network.

48. The system of claim 43, wherein said information communication means comprise the Internet.

49. The system of claim 43, wherein said information communication means comprise transmission via a cable system.

50. The system of claim 43, wherein said certification indicia comprises information identifying said first system.

51. The system of claim 43, wherein said certification indicia comprises information identifying said second system.

52. The system of claim 43, wherein said certification indicia comprises information identifying the date and time of receipt of said encrypted electronic document by said second system.

53. The system of claim 43, wherein said means for generating said certification indicia comprises a second portable processor coupled to said second system.

54. The system of claim 53, wherein said second portable processor is a TMU button.

55. The system of claim 43, wherein said second system further comprises:
   means for decrypting said received encrypted electronic document; and
   means for integrating said generated certification indicia into said decrypted electronic document.

56. The system of claim 55, wherein said second system further comprises means for printing said integrated decrypted electronic document and generated certification indicia.

57. The system of claim 43, wherein said means for generating said certification indicia further comprises means for determining unique transaction identification information.

58. The system of claim 57, wherein said certification indicia comprises said unique transaction identification information.

59. The system of claim 43, wherein said certification indicia comprises an electronic image suitable for printing by said second system.

60. The system of claim 59, wherein said electronic image comprises encrypted information.

61. The system of claim 60, wherein said encrypted information comprises a machine readable bar code.

62. The system of claim 43, wherein said certification indicia comprises data suitable to enable said first and second systems to generate an electronic image suitable for printing.

63. The system of claim 62, wherein said generated electronic image comprises encrypted information.

64. A system for certifiably transmitting an electronic document from a first processor-based system to a second processor-based system, said system comprising:
   a first processor-based system;
   a second processor-based system;
   a third processor-based system having means for generating a certification indicia;
   first means for information communication between said first system and said third system; and
   second means for information communication between said second system and said third system;
   said first system comprising:
      means for identifying an electronic document to certifiably transmit;
      means for encrypting said electronic document, said encrypting means comprising a public encryption key provided said first system by said third system via said first communication means;
      means for generating a first checksum of said encrypted electronic document;
      means for generating a first cipher including said first checksum;
      means for transmitting said encrypted electronic document and said first cipher to said third system via said first communication means; and
      means for receiving a certification indicia generated in response to said transmission of said encrypted electronic document via said first communication means;
   said third system comprising:
      means for receiving said encrypted electronic document and said first checksum via said first communication means;
      means for generating a third checksum of said received encrypted electronic document;
      means for determining if said third checksum and said first checksum are the same;
      means for transmitting said third checksum and said encrypted electronic document to said second system via said second communication means;
      means for receiving a second cipher from said second system via said second communication means;
      means for determining if said second system received the same encrypted electronic document transmitted by said third system;
      means for generating said certification indicia if said second system received the same encrypted electronic document transmitted by said third system;
      means for transmitting said certification indicia to said first system via said first communication means; and
      means for transmitting said certification indicia to said second system via said second communication means;
   said second system comprising:
      means for receiving said encrypted electronic document and said checksum from said third system via said second communication means;
      means for generating a second checksum of said received encrypted electronic document;
      means for determining if said second checksum and said received third checksum are the same;
      means for generating a second cipher including said second checksum;
      means for transmitting said second cipher to said third system via said second communication means; and
      means for receiving said certification indicia from said third system via said second communication means.

65. A system for certifiably transmitting an electronic document from a first processor-based system to a second processor-based system, said system comprising:
   a first processor-based system having at least one electronic document stored thereon, said first system also having a first portable processor removably coupled thereto;
   a second processor-based system having means for generating a certification indicia, said second system also having a second portable processor removably coupled thereto; and
   means for information communication between said first system and said second system;
   said first system comprising:
      means for identifying ones of said at least one electronic document to certifiably transmit;
      means for extracting a cryptographic key set from said first portable processor, said cryptographic key set having at least one encryption key and a decryption key associated with said encryption key;
      means for encrypting said electronic document, said encrypting means utilizing said encryption key extracted from said first portable processor;
      means for generating a first checksum of said encrypted electronic document;
      means for generating a first cipher including said first checksum;
      means for transmitting said encrypted electronic document and said first cipher to said second system via said communication means;
      means for receiving a certification indicia generated in response to said transmission of said encrypted electronic document from said second system via said communication means; and means for transmitting said decryption key to said second system upon receipt of said certification indicia;

said second system comprising:

means for receiving said encrypted electronic document and said first cipher from said first system via said communication means;

means for generating a second checksum of said received encrypted electronic document;

means for determining if said second checksum and said first checksum are the same;

means for generating a second cipher suitable to enable said second portable processor to generate said certification indicia;

means for communicating said second cipher to said second portable processor;

means, operable on said second portable processor, for generating said certification indicia if said first checksum and said second checksum are equivalent;

means for extracting said certification indicia from said second portable processor;

means for transmitting said certification indicia to said first system via said communication means; and means for receiving said decryption key from said first system via said communication means.

66. A method for certifiably transmitting an electronic document from a first processor-based system to a second processor-based system, said method comprising the steps of:

transmitting an electronic document from said first system to said second system, said transmitting step comprising the substeps of:

generating a first checksum of an electronic document stored on said first system;

temporarily coupling said first system to a second system to provide information communication between said first system and said second system;

transmitting said electronic document and said first checksum from said first system to said second system;

receiving a certification indicia at said first system from said second system;

receiving an electronic document at said second system transmitted from said first system, said receiving step comprising the substeps of:

receiving said electronic document and said first checksum from said first system at said second system;

generating a second checksum of said electronic document;

determining if said second checksum and said first checksum are the same;

coupling a second portable processor to said second system, said second portable processor having stored therein an algorithm for generation and dissemination of a certification indicia;

extracting said certification indicia from said second portable processor by said second system; and transmitting said certification indicia from said second system to said first system.

67. The method of claim 66, wherein said transmitting step further comprises the substeps of:

coupling a first portable processor to said first system, said portable processor having stored therein an algorithm for generation and dissemination of cryptographic keys;

extracting an encryption key of said cryptographic keys from said first portable processor by said first system, said encryption key having at least one decryption key associated therewith;

encrypting said electronic document stored on said first system, said encrypting step utilizing said encryption key extracted from said first portable processor;

extracting a decryption key of said cryptographic keys from said first portable processor by said first system, said decryption key being associated with said encryption key; and transmitting said decryption key to said second system after receipt of said certification indicia at said first system from said second system.

68. The method of claim 67, wherein said receiving step further comprises the substep of receiving said decryption key at said second system from said first system.

69. A certification apparatus for certifying the transmission of an electronic document from a first processor-based system to a second processor-based system, said apparatus comprising:

means for temporarily coupling said certification apparatus to said first system, said coupling means providing information communication between said certification apparatus and said first system;

means for temporarily coupling said certification apparatus to said second system, said coupling means providing information communication between said certification apparatus and said second system;

means for verifying that an electronic document transmitted from said first system contains substantially the same information as an electronic document received by said second system; and means for generating an indicia of certification when said verifying means indicates said electronic document transmitted from said first system contains substantially the same information as said electronic document received by said second system.

70. A system comprising a portable processor for certifying the transmission of an electronic document from a first processor-based system to a second processor-based system, said system comprising:

means for temporarily coupling said portable processor to said second system, said coupling means providing information communication between said portable processor and said second system;

means for verifying that an electronic document transmitted from said first system contains substantially the same information as an electronic document received by said second system; and means, operable on said portable processor, for generating an indicia of certification when said verifying means indicates said electronic document transmitted from said first system contains substantially the same information as said electronic document received by said second system.

* * * * *